United States Patent [19]

Lampi et al.

[11] Patent Number: 4,870,592
[45] Date of Patent: Sep. 26, 1989

[54] MANUFACTURING SYSTEM WITH CENTRALLY DISPOSED DYNAMIC BUFFER REGION

[76] Inventors: Wayne J. Lampi; Marvin R. Lampi, both of 16516 Glen Rd., Mount Vernon, Ohio 43050

[21] Appl. No.: 151,016

[22] Filed: Feb. 1, 1988

[51] Int. Cl.⁴ .............................................. G06F 15/46
[52] U.S. Cl. .................................... 364/468; 364/478; 364/474.11; 29/563; 29/38.9
[58] Field of Search ................. 29/563, 38.9; 364/468, 364/478, 474.11

[56] References Cited

U.S. PATENT DOCUMENTS

| | | | |
|---|---|---|---|
| 3,797,636 | 3/1974 | MacDonald | 198/210 |
| 3,952,388 | 4/1976 | Hasegawa et al. | 29/33 |
| 3,986,623 | 10/1976 | Keller | 214/16 |
| 4,035,904 | 7/1977 | Ishizaka et al. | 29/563 |
| 4,237,598 | 12/1980 | Williamson | 29/568 |
| 4,309,600 | 1/1982 | Perry et al. | 364/468 |
| 4,472,783 | 9/1984 | Johnstone et al. | 364/468 |
| 4,503,596 | 3/1985 | Ida et al. | 29/568 |
| 4,550,682 | 11/1985 | Juve et al. | 118/425 |
| 4,602,417 | 7/1986 | Mesch et al. | 29/564 |
| 4,615,719 | 10/1986 | Pauluk et al. | 65/29 |
| 4,621,408 | 11/1986 | Gabrielli | 29/568 |
| 4,630,216 | 12/1986 | Tyler et al. | 364/468 |
| 4,646,245 | 2/1987 | Prodel et al. | 364/468 |
| 4,711,016 | 12/1987 | Grenschow et al. | 29/563 |
| 4,722,653 | 2/1988 | Williams et al. | 29/563 |

Primary Examiner—Allen MacDonald
Attorney, Agent, or Firm—Mueller and Smith

[57] ABSTRACT

A manufacturing system and method wherein a dynamic buffer region is maintained under computer control within a centralized region surrounded by individual machining stages. Robots, preferably mounted on rotating overhead bridge beams, function to feed the machine stages as well as accommodate for surges in the production sequence occasioned due to imbalances in cycling times, down time in the machine and the like. Computer control over the buffer region provides for the assignment and reassignment of storage locations therein for workpieces to maintain system production. Safety techniques are provided limiting operator access to individual machine stages for down time maintenance and function to assure that robots otherwise servicing the down machine stage are excluded from that machine region.

37 Claims, 24 Drawing Sheets

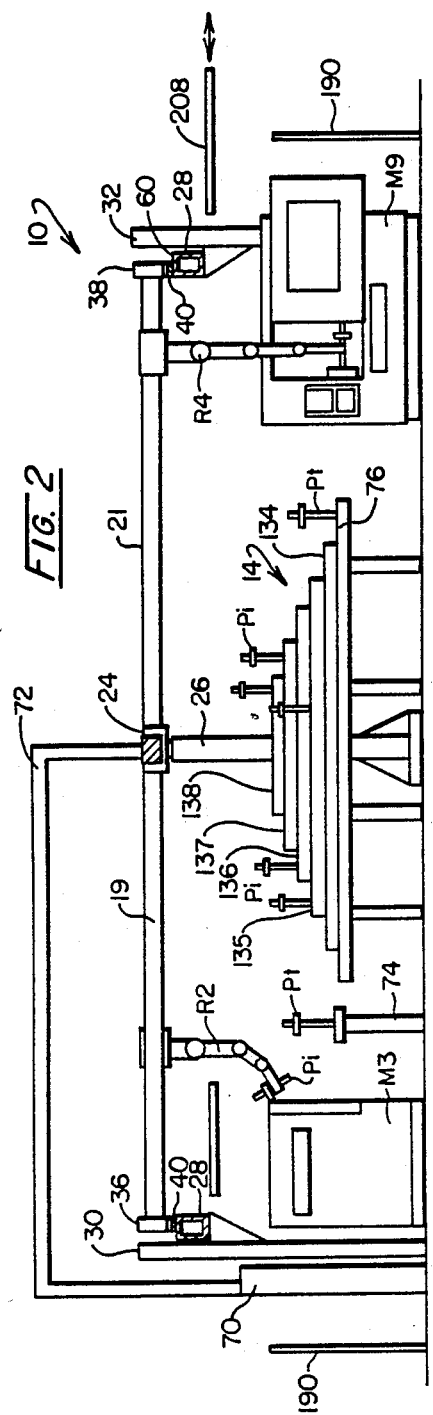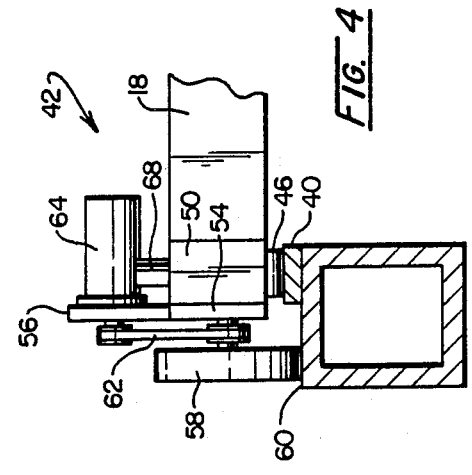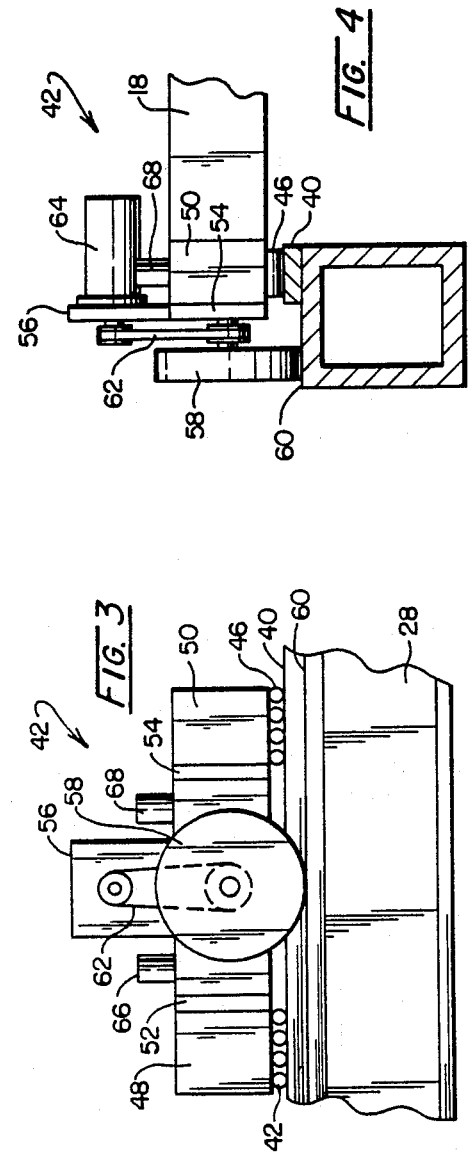

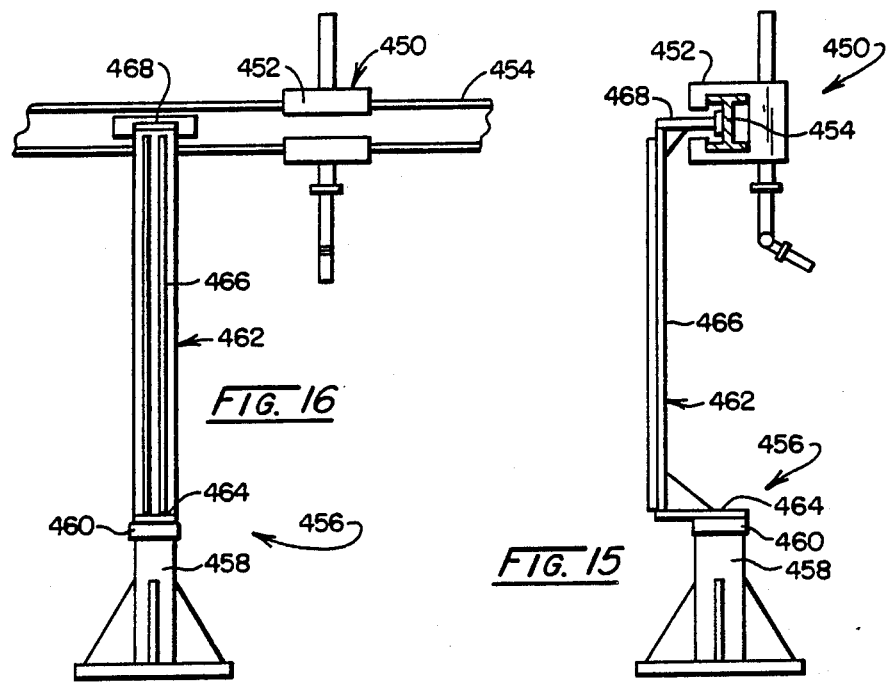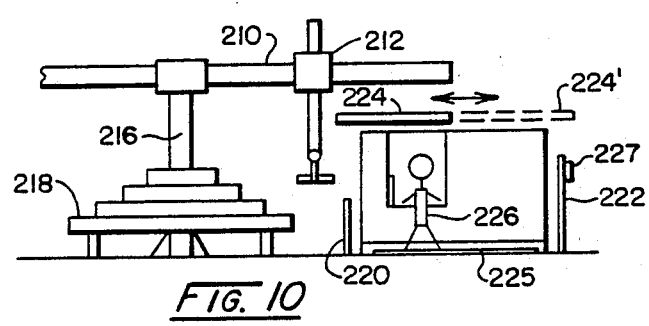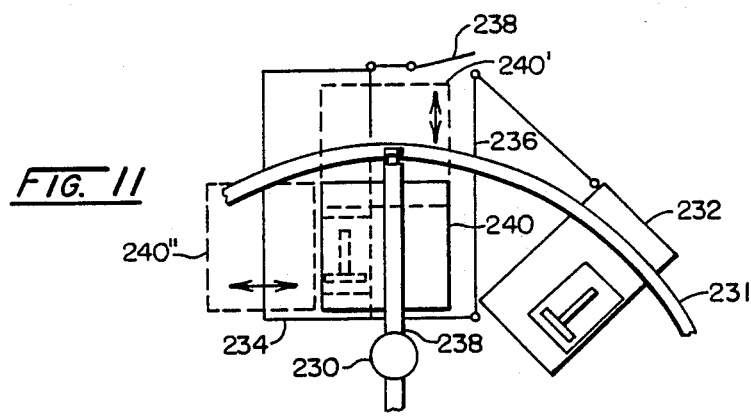

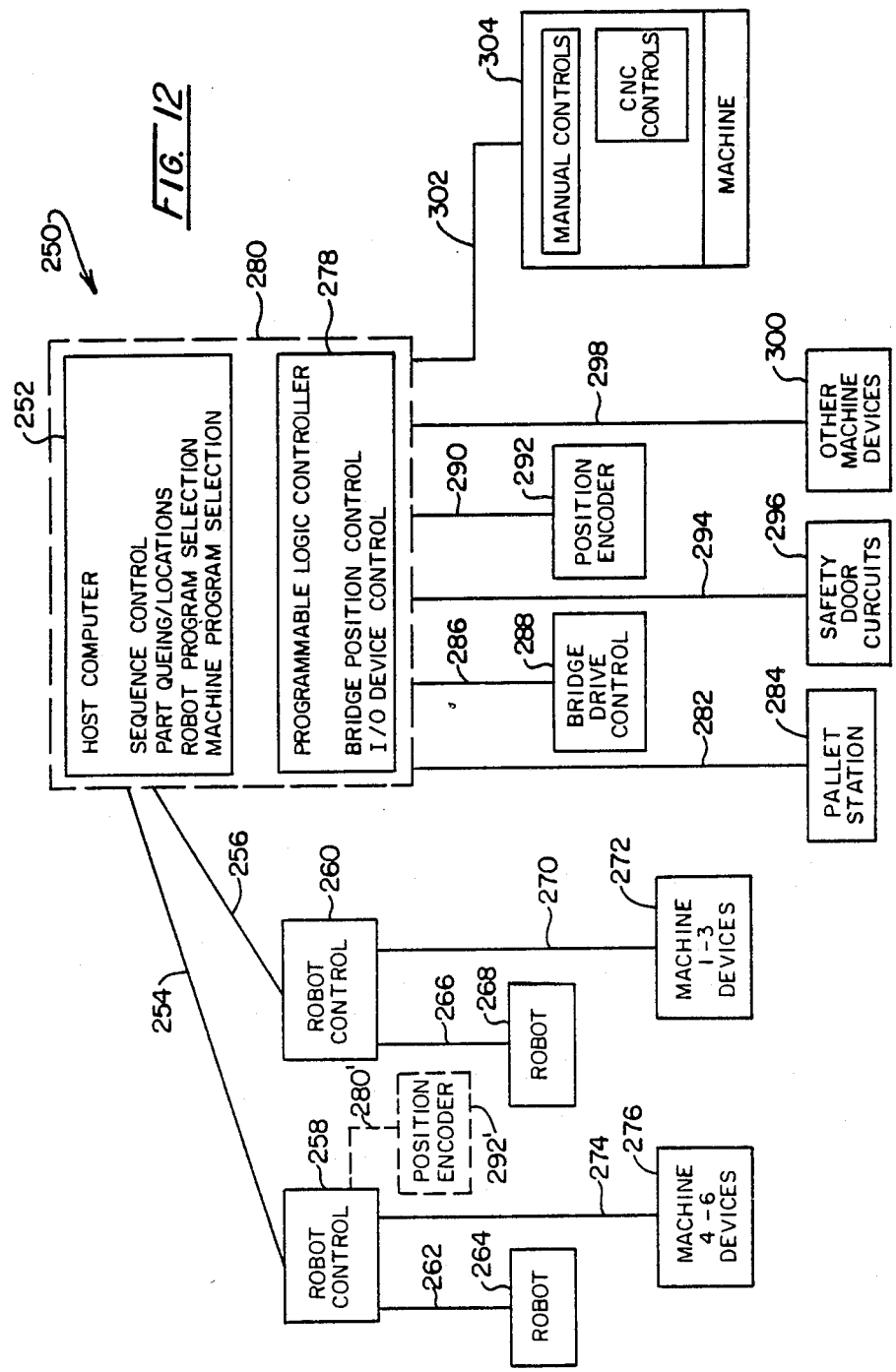

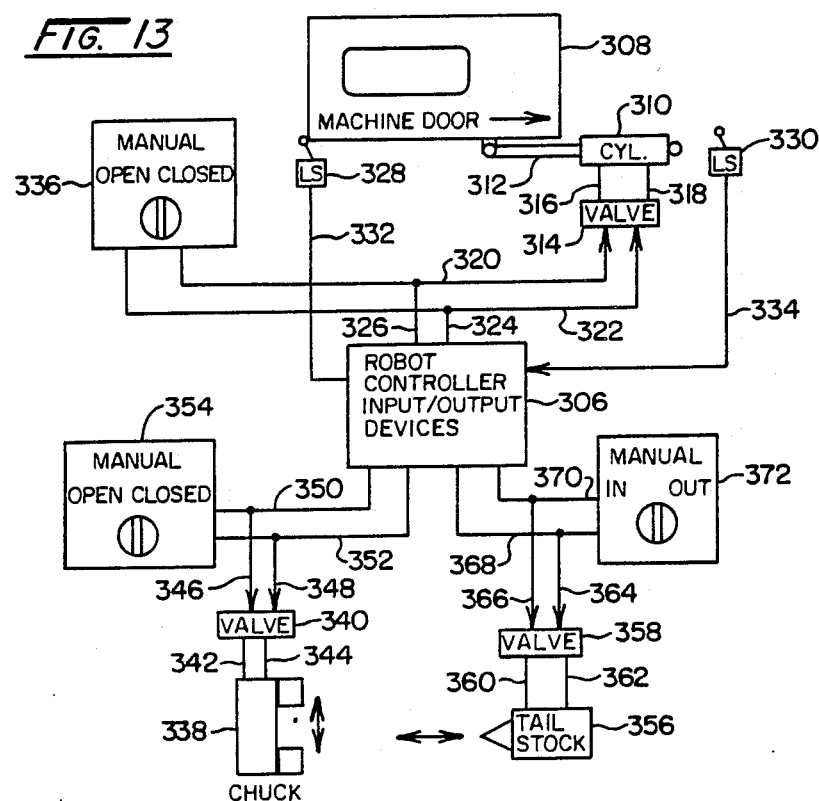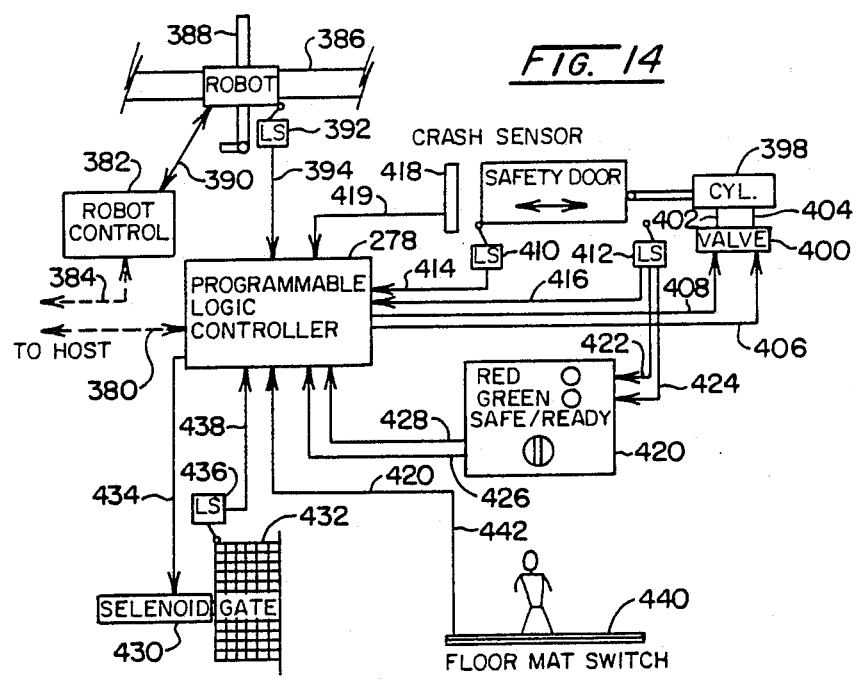

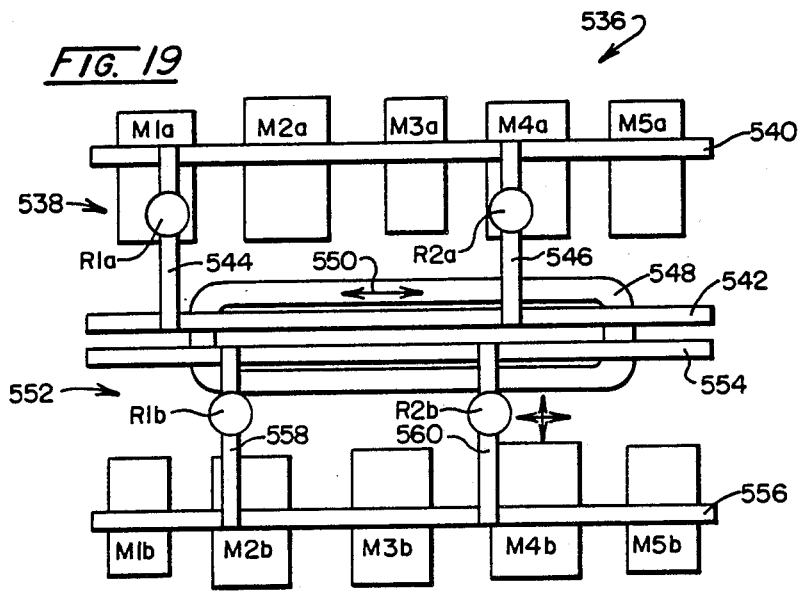
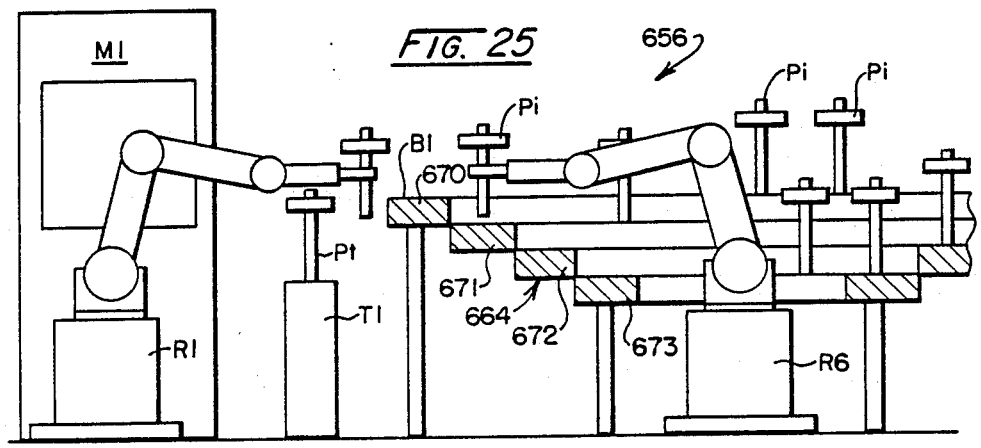

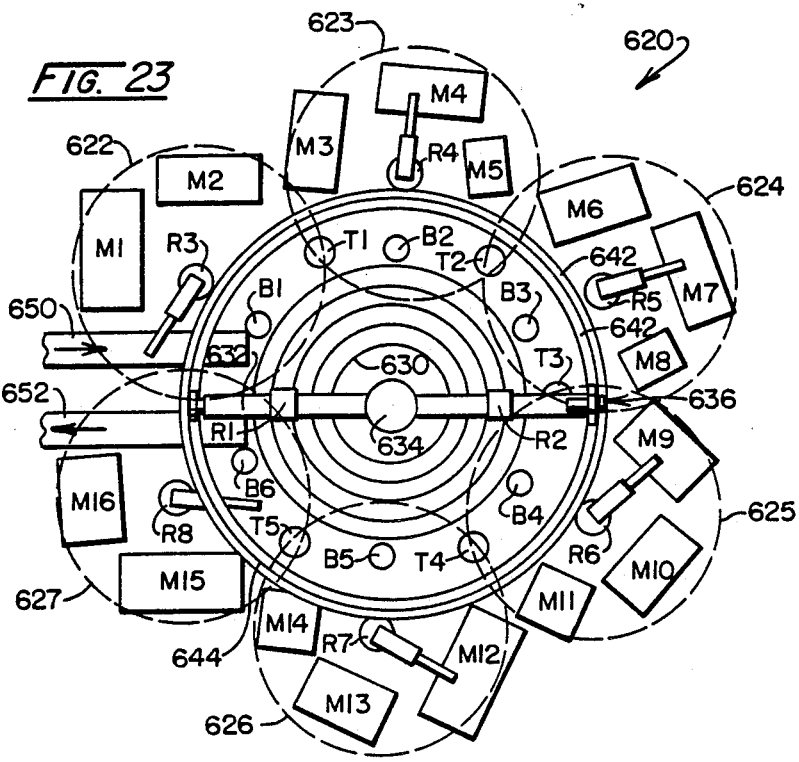

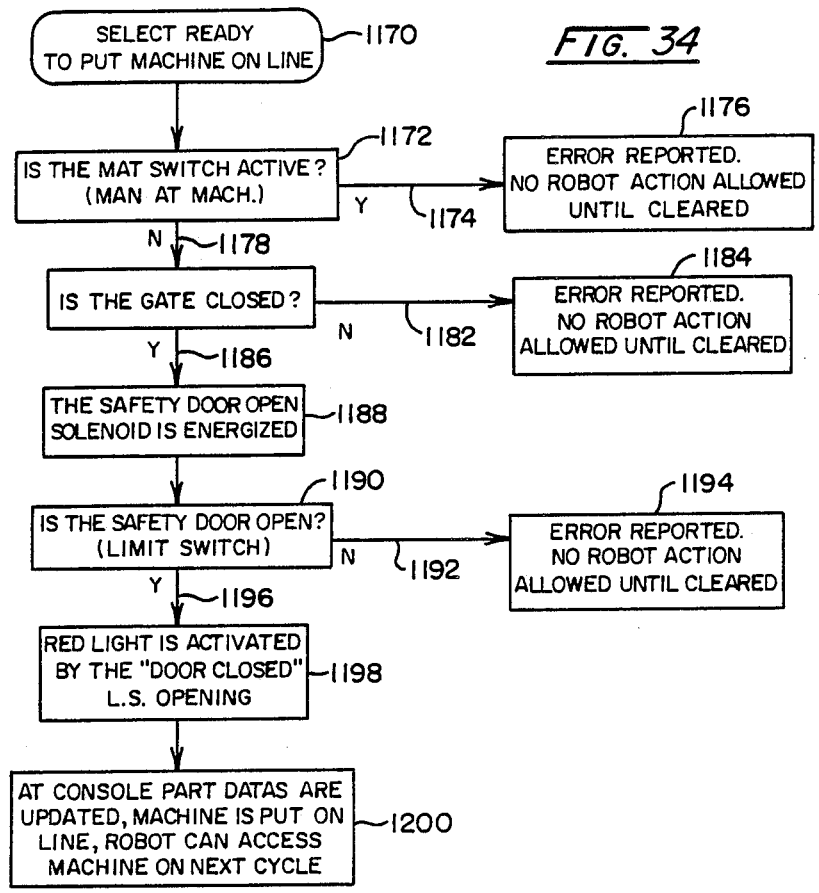
FIG. 34
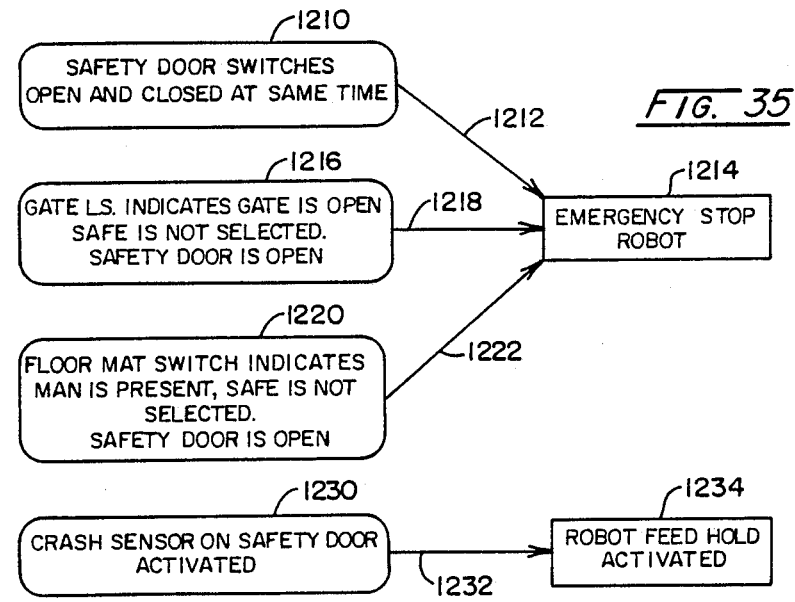
FIG. 35
FIG. 36

MANUFACTURING SYSTEM WITH CENTRALLY DISPOSED DYNAMIC BUFFER REGION

BACKGROUND OF THE INVENTION

Industrial manufacturing facilities, for the most part, include plant regions or space functionally allocated to the performance of piece part machining and fabrication procedures. The traditional "machine shop" has been composed of a variety of machine tools which treat input stock to carry out such classic operations as turning, milling, drilling, grinding, forging, centering, stamping, heat treating, washing, and the like. Improved machine technology has significantly expanded machine shop capabilities and effectiveness for performing these operations, for example, numerically controlled devices have become commonplace and serve to somewhat automatically carry out a variety of machining functions. The "machine center" will perform such procedures as milling, drilling, boring, tapping and others sometimes with the requirement that guards be actuated or safety doors be opened and closed, and loading and unloading of stock and tool components be carried out. Maintenance down time necessarily is a factor in the operation of all such machine tools whether automated or otherwise. While these various devices, arrayed in a machine shop environment prove effective in the production of most piece part designs, their efficiencies as reflected in the cost of each part diminish as different types or configurations of parts are required to be produced.

Efforts to automate the manufacture of piece parts as well as to carry out assembly procedures and the like have taken diverse technical approaches, determined principally by the numbers of items called for in the production process. Where the part design remains consistent and the numbers called for are, in effect, of great extent, a wider selection of automated but somewhat dedicated aproaches becomes available to the plant designer. However, as the parts requiring machining change in design and lower volume "batch" production is called for, manufacturing efficiencies become more elusive to achieve. Anticipated by some investigators as to account for as much as 75% of production, batch manufacturing is considered to be labor intensive, involving machining operations which traditionally are slower due to required operator attention. See in this regard: Holmes, "Justifying a Robot Machining System in Batch Manufacturing," *Robotics Today*, p. 86, 182, Annual Edition Robotics International, S.M.E., Dearborn, Mich. 48128. Batch production consists of a relatively high part mix and low individual part volumes. Where machines in the shop are arranged functionally for these procedures, high in-process inventory and long lead times typically are encountered. Customized automated systems are not applicable for such batch manufacturing, inasmuch as they prove too costly. Resort necessarily has been made to providing some automation of available standards machines and assemblers already in the shop inventor of the fabricator.

A modicum of improvement in batch manufacturing productivity has been accomplished with the introduction of computer numerical control (CNC) machine tools, machine centers, group technology, tool management, and robot piece-part feeding systems. Thus far, flowline designs for manufacturing systems have been hindered somewhat by available feeding approaches. For example, palletization often has been considered as an essential aspect of feed procedure. However, such palletization techniques often preclude necessary machinery procedures such as turning, an often called for activity.

The above limitations have been seen to restrict localized automation suited for batch scale production. Robots have been employed to "pick and put" piece parts into and out of machines in batch-type production installations sometimes referred to as "flexible machine systems" (FMS). Movement of parts from one machine to the next in the FMS production flow sequence has been carried out, for example, on an automated and larger scale basis by gantry supported robots. These rectilinear systems necessarily require a somewhat extensive amount of plant floor space and have practical limitations with respect to throughput rates, i.e. they are not high volume systems. For example, the extent of travel of the robots by gantry movement necessarily is limited by machine cycle considerations, i.e. the robot being required to return and feed an initial production stage of a given section of the system on a cyclical basis. As an example of travel time limitations, a gantry carried robot may feed a first or head machine, then commence to travel down the gantry bay to carry out subsequent machine servicing operations. However, the extent of this travel is limited by the part cycle of the first machine. If that part cycle, for example is three minutes, then a corresponding limitation is placed upon the available servicing region of the process starting robot. As a result, additional robots and supporting movable gantry bridges must be employed in the production line which, in further consequence, becomes longer requiring more and more plant space. However, the gantry robot systems do achieve the advantage of process flexibility using conventional machine stages.

Additional considerations which enter into the design of batch-type production systems include requirement for part control and storage at machine inputs. Realistically, the cycle times of machines will differ from stage to stage in a production process flow and, as a consequence, queying of piece parts at the inputs to machine stages becomes the norm, zones of piece parts at the inputs to machine stages becomes the norm, zones of piece part storage or stand-by retention usually being required throughout the production process path. As a consequence, higher in-process inventory levels are necessitated. Requisite storage zones also call for expanded plant space allocation for a given flexble machine system, to contribute further to production overhead costs. Downtime for machine maintenance and repair also is a process design consideration. Where a given stage in the production flow path is down, then surges in piece part may be anticipated and storage banks or zones must be designed to handle worse case surge conditions. Such zonal requirement may become extensive where surges amounting, for example, up to 1,000 parts can be anticipated.

While robots hold out promise for achieving automation in batch level production operations, their use for that purpose thus far has been inadequate in terms of efficiency. The latter inadequacies stem principally form station-to-station travel time limitations, piece-part storage requirements, limited service, access to machines during their operation (a typical machine experiences 10% downtimes), and extended plant floor space requirements. It is necessary that, for any given production facility, the use of individual robots be maximized, thus lowering the number of such devices required to perform the function of the facility.

SUMMARY

The system of the invention, in general, is configured as one or more flexible manufacturing cells (FMC) wherein conventional production machines are selectively grouped in a periphery about a centralized, dynamics buffer referred to as a "bellows" banking region. This buffer region as well as the machines group thereabout are accessed by robots which, in a preferred embodiment, are suspended upon a rotationally moveable beam located overhead or above the machine grouping and the dynamic buffer. The resultant parts or workpiece handling system constituting the manufacturing cell as thus configured achieves a variety of advantageous attributes. Such bellows banking provides for a balancing of the machine operations such that a maximized up-time performance is possible from the machine grouping. This performance further is enhanced by a design availability for human intervention to provide machine maintenance which must be designed into any system. However, this maintenance availability may be provided without shutting down the operations of contiguous machine stages and through the use of bellows banking to accommodate for rescheduled part movement throughout the production system. An additional advantage accruing from the system resides in the adaptability of robots to manipulate both round and cubic or rotating and prismatic parts for production operation. By contrast, typical machining operations generally require some form of fixturing, thus limiting automated activity to non-round or prismatic parts. Control over the entire arrangement is integrated to achieve maximized part production flow. The latter terms have developed in view of the buffef region's capability to assign and reassign part or workpiece sotrage locations depending on machine conditions during a manufacturing procedure.

The technique of the invention permits a much higher utilization of robots, thus necessitating fewer devices for a given production facility. Bellows bank rotation permits reverse flow of parts through a given manufacturing cell, thus permitting random machine processing and, for some applications, the elimination of transfer stations. Such random processing often serves to lower the number of machines required in a cell, inasmuch as pieceparts can be returned from later machine stages to earlier ones, for example drilling stages, to repeat that stage's function and eliminate the need for additional drilling machines.

Another feature of the invention provides a manufacturing system wherein workpieces are treated at a predetermined sequence of machine stages from first to last having given machine cycle time characteristics. A dynamic buffer is provided having a predetermined periphery within which is positioned a support surface for accessibly supporting select ones of the workpieces at assigned locations. A machine stage region is positioned adjacent the dynamic buffer periphery for retaining machine stages and an input is provided for positioning incoming workpieces at an input region. Additionally, an output is provided for receiving the workpieces subsequent to treatment by the last machine stage of the system. A robot is mounted for accessing the dynamic buffer in the machine stage region and for effecting movement of the workpieces from the input region to and from the machine stage and the dynamic buffer support surface, and to the output in response to control inputs. A control is provided having a predetermined control program for deriving the control input to effect movement of the workpieces by the robot in accordance with a predetermined sequence and for identifying and assigning available dynamic buffer locations at effecting movement by the robot of select workpieces to assign a location in the dynamic buffer for temporary retention to accommodate variations of the machine cycle time characteristics and unforeseen machine cycle delays.

Another feature of the invention is the provision of a manufacturing system wherein workpieces are treated at a predetermined sequence of machine stages from first to last having given machine cycle time characteristics which includes a dynamic buffer having a predetermined periphery within which is provided a support surface for accessibly supporting select ones of the workpieces at assigned locations. A machine stage region is positioned adjacent the dynamic buffer periphery and configured for retaining the machine stages in predetermined groupings. An input arrangement provides for positioning incoming workpieces at an input region and an output receives the workpieces subsequent to treatment by the last machine stage. Transfer stations are provided intermediate predetermined machine stage groupings and a first robot arrangement mounted for accessing each machine stage predetermined grouping and the transfer stations associated therewith for effecting movement of the workpieces therebetween in response to control inputs. A second robot arrangement is mounted for accessing the dynamic buffer and the transfer station for effecting movement of the workpieces therebetween in response to control inputs and a control is provided having a predetermined control program for deriving the control input to effect movement of the workpieces by the first and second robot arrangements to effect the predetermined sequence of treatment and for identifying and assigning available dynamic buffer locations and effecting movement by the second robot arrangement of select workpieces to the assigned locations for temporary retention to accommodate variations of the cycle time characteristics and unforeseen machine cycle delays.

Another feature of the invention provides a method for treating workpieces at a predetermined sequence of industrial process locations from first to last, the locations exhibiting varying treatment intervals which include the steps of:

providing a dynamic buffer having a support surface having temporarily assignable storage locations for the workpieces;

locating the process locations about the periphery of the dynamic buffer;

providing a supply of an untreated workpiece;

providing a robot assemblage controllable to maneuver the workpieces in accordance with control instructions from the supply to the process locations and to and from the dynamic buffer support surface;

assigning part identification, completion level and instantaneous position data to each workpiece from the supply;

controlling the robot assemblage with control instructions to maneuver the workpieces into and out of a predetermined sequence of the process locations;

updating the completion level and instantaneous position data of each workpiece in correspondence with the maneuvering thereof;

assigning available temporary storage locations for the workpieces having the given completion levels when treatment levels vary to create supplies of the workpieces in excess of those required by succeeding process locations within the predetermined sequence;

controlling the robot assemblage to move the workpieces having the given completion levels to the assigned temporary storage locations;

identifying the process locations requiring workpieces having given completion levels and corresponding storage locations retaining such workpieces; and controlling the robot assemblage to move the identified workpieces having the given completion levels into the identified process locations.

Another particular aspect of the invention is to provide a manufacturing system wherein workpieces are treated at a predetermined sequence of machine stages from first to last which includes a machine stage region for retaining these machine stages in a predetermined sequence. An input arrangement is provided for positioning incoming workpieces at an input region and an output arrangement provides for receiving the workpieces subsequent to treatment by the last machine stage. A robot assemblage is included for accessing the machine stage region and for effecting movement of the workpieces from the input region, to and from the machine stages and to the output in response to control inputs. An overhead support provides for movably supporting the robot assemblage above the machine stage region to effect the machine stage accessing by the robot. A safety barrier is mounted above select machine stages within the machine stage region and is actuable for movement from a stand-by position to a safety position over the select machine stage media maintenance vicinity to physically prevent the robot assemblage from movement thereinto. A control having a predetermined control program derives the control inputs to effect movement of the workpieces by the robot assemblage in accordance with the predetermined sequence and is responsive to a maintenance access signal to restrict the movement of the robot assemblage from travel into the immediate maintenance vicinity of the select machine stage and to effect the safety barrier actuation.

Other objects of the invention will, in part, be obvious and will, in part, appear hereinafter. The invention, accordingly, comprises the system, apparatus and method possessing the construction, combination of elements, arrangement of parts and steps which are exemplified in the following Detailed Description.

For a fuller understanding of the nature and objects of the invention, reference should be had to the following Detailed Description taken in connection with the accompanying drawings.

BRIEF DESCRIPTION OF THE DRAWINGS

FIG. 2 is a partial sectional view of the manufacturing system of FIG. 1;

FIG. 3 is a schematic representation of a drive arrangement for the bridge structure of the system of FIGS. 1 and 2;

FIG. 4 is a side partial sectional view of the drive assembly of FIG. 3;

FIG. 10 is a sectional elevational schematic representation illustrating a safety frame geometry employed with the system of the invention;

FIG. 11 is a schematic top view showing a safety arrangement for a machine stage within the manufacturing system of the invention;

FIG. 12 is a chart showing an exemplary control architecture which may be employed with the system of the invention;

FIG. 13 is a diagrammatic representation of certain control features discussed in conjunction with FIG. 12;

FIG. 14 is a diagrammatic representation of safety frame or door type circuits as discussed in conjunction with FIG. 12;

FIG. 15 is a side elevational view showing, in schematic fashion, a bridge structure embodiment according to the invention;

FIG. 16 is a rear elevational view of the structure shown in FIG. 15;

FIG. 19 is a schematic top view of the employment of a dynamic buffer region according to the invention with a gantry bay type manufacturing system;

FIG. 23 is a schematic view of a manufacturing system employing floor mounted robots in combination with the bridge mounted robots serving a dynamic buffer.

FIG. 25 is a partial sectional schematic view of the system of FIG. 24;

FIG. 26 is another embodiment of the manufacturing system of the invention employing robots which are transversely moveable along floor mounted tracks and which perform in conjunction with a centrally disposed dynamic buffer region;

FIG. 34 is a flow chart of a subroutine employed by the control feature of the manufacturing system of the invention for putting a machine stage on-line.

FIG. 35 is a diagram showing conditions for carrying out an emergency stop of robots;

FIG. 36 is a diagram showing a robot feed hold activation upon the presence of a crash sensor activation;

DETAILED DESCRIPTION

Figure 1:
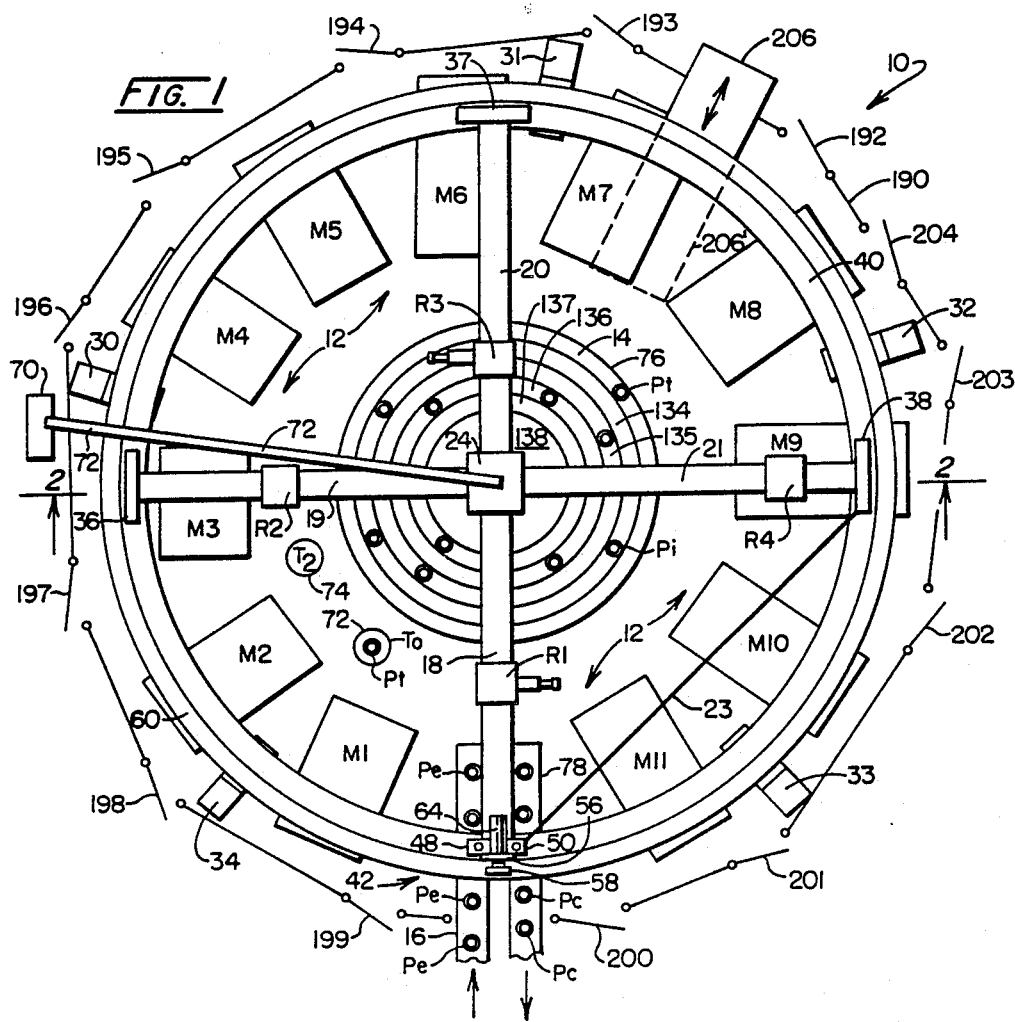
FIG. 1 is a top schematic representation of a manufacturing system according to the invention showing a generally circular configuration.

Referring to FIG. 1, a top view of a flexible machine cell according to the invention is revealed generally at 10. The figure shows a sequence of machine stages or process locations identified as blocks M1 through M11 which are arranged in a generally circular pattern within a machine stage region represented generally at 12. Machine stage M1–M11 may, for example, provide the manufacturing steps for example of turning, face centering, milling and drilling, hobbing, rolling, heat treating, washing boring, welding, fabrication, painting, and grinding, or combinations thereof. Additionally, these stages may provide automated assembly procedures. The machine stage region 12 is positioned adjacent the periphery of a dynamic buffer or bellows bank 14 which, in the present embodiment, is seen to be provided having a generally circular periphery in correspondence with the circular orientation of the machine stages M1–M11. The buffer 14 may rotate where desired. Workpieces or parts are introduced into the system 10 in palletized or other convenient technique such as conveyors or the like as represented by an input conveyor stage 16. From stage or region 16, the workpieces are positioned within predetermined sequences into the machine stages M1–M11 by select robots represented at R1–R4 which, in turn, are suspended above the machine stage region and dynamic buffer upon a structure containing supporting beams 18–21. Looking additionally to FIG. 2, this beam 18–21 assembly is seen to be pivotally mounted by a central bearing 24 upon a fixed, upstanding post 46. The terminal ends of the beams 18–21 are supported by end assemblies upon a continuous circular peripheral support beam or rail 28 which, in turn, is retained in the overhead position shown by columns or posts as at 30–34. It should be understood that a variety of structural configurations for beams 18–21 may be provided, including gussets and similar strengthening devices. In the latter regard, tension rods or cables may be employed, one of which is illustrated in FIG. 1. The outwardly disposed end assemblies of overhead beams 19–21 are shown to comprise respective bearing structures such as bridge tracks 36–38 which, in turn, are moveably supported upon the upwardly-disposed smooth surface of a circular way 40 supported, in turn, upon peripheral beam or rail 28. Bearing trucks 36–38 are mounted for free movement with the corresponding driven movement of overhead beams 18–21. In the latter regard, drive may be imparted by a peripherally disposed motorized drive assembly represented in general at 42 in FIG. 1.

Looking momentarily to FIGS. 3 and 4, the motorized drive assembly 42 is shown at an enhanced level of detail. This outboard form of drive 42 is supported upon the smooth way surface 40 by a pair of bearing assemblies 44 and 46. These assemblies, for example, may be provided as a slideable teflon surface, a roller bearing assemblage or the like. The bearing packages 44 and 46 are respectively coupled to box extensions 48 and 50 fixed to and extending normally from the end of beam 18. Extensions 48 and 50 also are respectively configured to retain L-shaped slide retainers 52 and 54 which support an inverted T-shaped carriage 56 for vertical slideable movement. Rotatably mounted to the lower side of carriage 56 is a drive wheel 58 having a tractional surface engageable with the relatively rough upwardly-directed surface 60 of peripheral support beam 28. Wheel 58 is driven by a belt and pulley assemblage 62, driven, in turn, from an electric motor 64 (FIG. 4) attached to the inwardly disposed of the upper portion of carriage 56. The carriage itself is downwardly biased to urge the surface of drive wheel 58 into the surface 60 by a pair of cylindrical compression springs 66 and 68 mounted between carriage 56 and beam and box assembly 18, 50 and 52. This form of elongate structure 42 serves to suppress bending movement in arm 18 and represents the general elongate structure (without a drive wheel) employed for trucks 36–38.

Returning to FIGS. 1 and 2, robots R1–R4 are mounted for driven translational movement along their respective bridge beams 18–21 and, thus, may be positioned so as to operationally access each of the machine stages M1–M11, as well as the dynamic buffer region 15. Power and control into robots R1–R4 may be provided in conventional fashion, for example conduiting and emanating from cabinet 70 and extending via protective conduit 72 to the region at pivot 26. Flexible conduiting to each of the robots may be provided in conventional fashion. With the arrangement, workpieces $P_e$ introduced at input arrangement 16 are grasped by the end effector of robot R1 and moved into the beginning sequence of machine stages, for example machine M1. Simultaneously after the process has commenced, robots R2–R4 may service machine stages to which they are proximate to improve throughput rates. In general operation, following the completion of operations at a given machine stage, for example stage M1, the workpiece having been worked upon may be positioned at a transfer station as represented, for example, at 72 and 74. The workpieces positioned thereon are represented at Pt. Preferably, the transfer stations are sufficiently remote from a given machine stage such that any workpiece positioned thereon may be moved by the robots during such period as that associated machine is under repair or the like. As an alternative separate transfer stations, one region of the dynamic buffer 14, for example tier 76, may be employed for this purpose. As the workpieces are treated from stage to stage in a manufacturing sequence, any queing which might occur may be accommodated for by robotically manipulating delay constituted or identified pieces at computer selected positions within the dynamic buffer. These interim piece parts are identified in the buffer region 14 at $P_i$. Following completion of any given workpiece, it is robotically manipulated to an outgoing pallet or conveyor herein represented in FIG. 1 at 78 as carrying completed workpieces or piece parts $P_c$.

Figure 5:
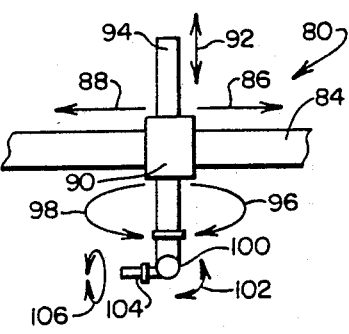
FIG. 5 is a schematic representation of gantry robot structure.

Selection of the type of robot employed with the cell 10 involves a variety of considerations including the degree of articulated movement required, the weight of the workpieces involved, and the degree of accurate motion required of the drive for bridge beams 18–21 as well as that required in translating the robots along the beams. Generally, two categorizations of robots are available in the current marketplace, the Gantry or mast or telescoping type robot as schematically depicted in FIG. 5 at 80 and the articulated arm or amphroeomorphic arm manipulator type robot represented in general at 82 in FIG. 6 looking to FIG. 5, gantry robots as at 80 are configured for movement along a bridge beam represented at 84 in a translational sense as represented by arrows 86 and 88. For the instant applications, beam 84 typically will rotate. The devices generally are selected for use with heavier workpieces, for example in the range of about 50 to 2,000 pounds and thus this form of robot generally will exhibit a robust structure. In the schematic arrangement shown at 80, mounting of the robot upon the bridge beam 84 is represented at 90, while vertical telescoping motion as represented by arrow 92 is provided by movement of the stem 94 in the directions represented by arrows 92. The stem 94 or a coupling with it also permits what is, in effect, stem 94 rotational movement as represented by arrows 96 and 98. Typically, a robust knuckle coupling is provided with the robot 80 as represented at 100 to provide an arcuate manipulation as represented by arrow 102. The end effector as represented at 104 typically is rotatable as represented by arrow 106. While the degrees of freedom of movement of gantry robots as at 80 are somewhat restricted in comparison with articulated devices as at 82 (FIG. 6) such additional freedom of movement may not be called for especially in the case of large workpieces. Generally the machine cycle times involved with such workpieces are somewhat standard and the time element involved in positioning the workpieces within the machines does not become particularly critical. However, where compound movement is required with respect to movement of the bridge components 18–21 for manipulation of a given workpiece by a given robot, a higher level of computational control is required by the system to add the software complexity.

Figure 6:
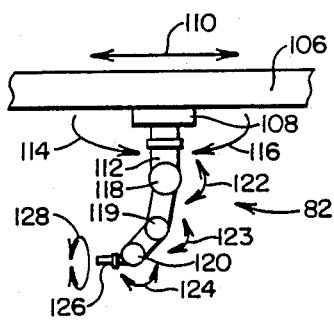
FIG. 6 is a schematic representation of an articulated arm robot mounted upon an overhead bridge component.

The articulated robot 82 as shown in FIG. 6 conventionally is floor or pedestal mounted and enjoys a capability of higher flexion for workpiece maneuverability as well as higher workpiece positioning and removal speed. However, the articulated structuring imposes practical limits to workpiece weight capacity, for example, the typical workpiece handled by manipulators as at 82 will be under about 70 pounds. For the instant application, the robot typically is installed upside-down with respect to the conventional case. In this regard, an overhead support beam as at 18–21 is represented at 106, the robot mounting component 108 being mounted thereon for movement along the beam as represented by arrow 110 as well as with the beam, for example, in the rotary sense shown in FIG. 1. Rotational movement of the first linkage of the device 112 is represented by arrows 114 and 116. Additionally, articulated motion further is effected through linkage joints 118–120 as represented by respective arrows 122–124. Finally, the end manipulator 126 of device 82 is seen to be rotatable as represented by loop arrow 128.

Returning to FIGS. 1 and 2, the dynamic buffer region 14 is seen to be structured as sequence of ascending tier surfaces or levels commencing with the transfer service 76 and continuing with tiers 134–138. This form of structure, as is more clearly illustrated in FIG. 2, permits a higher piece-part density within the buffer region. Of course, the buffer region can be flat and can assume any of a variety tiered configurations. Further, each of the tiers may be rotated to provide enhanced robot access. By providing tiering as shown in FIGS. 1 and 2, robot access to certain part configurations, for example, generally cylindrically shaped workpieces may be enhanced.

Figure 7:
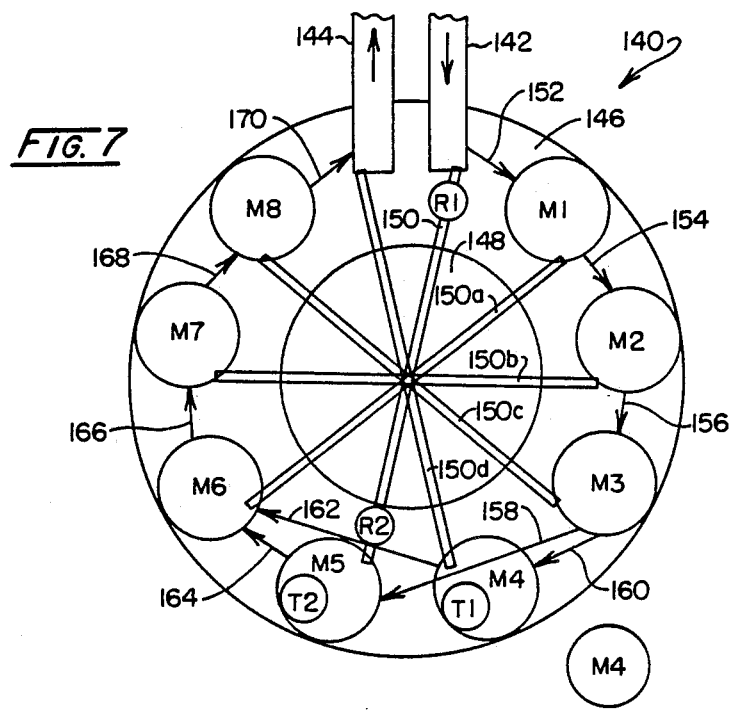
FIG. 7 is a diagrammatic representation of an exemplary workpiece flow of a manufacturing system according to the invention.

Turning to FIG. 7, a diagrammatic representation of a manufacturing system such as that described at 10 is identified in general at 140. This manufacturing system 140 includes an input function such as a conveyor pallet 142 and a corresponding output conveyor or pallet represented at 144. In the figure, eight machine stages identified as circular regions M1–M8 which are located within a machine stage region of circular configuration represented at 146. Inwardly disposed from region 146 is a dynamic buffer region 148 and this model is seen to be structured about a single rotating beam dual robot arrangement represented as a beam or bridge 150 carrying two transversely moveable robots represented by circles R1 and R2. The beam 150 may assume a broad variety of rotational orientations as represented by position 150a–150d. Part flow carried out by the beam 150 and robot R1–R2 combination is represented by a sequence of arrows intermediate machine positions M1–M8. In this regard, robot R1 will be called upon to remove entrance workpieces from the input 142 and, as represented by arrows 152, 154, and 156, manipulate the workpieces from machine M1 to machine M2 and thence to machine M3. To provide cycle balancing, the piece parts, for example, may then go to slower cycle machines as at M4 and M5 from machine M3 as represented by arrows 158 and 160. Certain portions of the dynamic buffer 148 may be employed in the course of these manipulations, for example as transfer stations or regions as represented by the encircled areas T1 and T2. Alternately, these transfer regions may be positioned adjacent the machine stages but at locations permitting their access though the machine may be shut down for maintenance.

The part flow representation continues as shown by arrows 162 and 164 representing an outputting of completed workpieces from respective machine stages M4 and M5. The program then continues from machine stage M6 in serial fashion to stage M8 and to the output region 144 as represented by arrows 166, 168 and 170. In the event that bad parts are developed requiring the retrieval of replacement parts or machine cycle time imbalance occurs from the idealized representation at system 140, then the dynamic buffer 148 is called upon to accommodate for the queing of parts as well as the supplying of subsequent machines with parts. Looking additionally to FIG. 8, a representation of a computer controlled assignment of sectors within the dynamic buffer 148 is represented by buffer region 172. One portion which may be controlled by computer as a sector is, for the instant illustration, assigned as a buffer region for machine stage M5 as represented at section 174. For this representation, a subsequent series of three sectors 176, 178 and 180 represent assignable locations in dynamic buffer which are employed to accommodate for workpiece surges occasioned with machine shutdown or the like. A next sector 182 then is assigned for workpiece placement by computer control as a buffer for the succeeding machine stage M6. Spatial representations of the location of machine stages M4 and M5 in FIG. 8 reveal that for the instant example, that segment of dynamic buffer located just past the preceding machine within the system is assigned a buffer function. Such an arrangement functions to decrease access time cycles by allowing workpieces to be dropped or retrieved en route to a next machine stage. Looking to FIG. 9, an exemplary illustration of the stacking of workpieces PT and PI within a segment 184 is revealed. For computer controlled locational purposes, each position for a part is assigned a location coordinate value. During the course of operation of the manufacturing system as at 10 these locations may be filled or emptied and then reassigned for placement for retention of subsequently developed workpieces. Thus, the buffer functions in a "dynamic" fashion having regions filling and emptying depending upon the performance of any given machine stage or stages within the system.

Machine cell areas wherein robots are manipulated under automated or computerized control represent quite dangerous environments for user personnel. Thus, it becomes necessary to devise some form of assured safe entry procedures. The system of the instant invention enjoys the advantage of providing for individual machine maintenance, the remaining stages continuing to be active, while the safety of personnel working within a given machine region is assured. In this regard, the robots may avoid a given machine area during its down time, employing the dynamic buffer as at 14 to accommodate for workpiece flow adjustment. Thus, all remaining machine stages which are operable maintain such operation, again using the dynamic buffer 14 during down time intervals of individual machines. To assure no malfunction in the control arrangement for carrying this out, physical safety barriers are employed with respect to each machine stage region and, the machine system or cell region as at 10 is fenced in with a barrier incorporating control access door corresponding, for example, with each machine stage. Such a human barrier or fence is represented in FIGS. 1 and 2 at 190, FIG. 1 also revealing the presence of discrete individual access doors 192–204. As a second level of assurance that any of the robots R1–R4 will not be capable of accessing a machine stage, a physical barrier sometimes referred to as a door but provided, for example, as a moveable rigid frame may be slideably moved into the overhead region of the machine stage. Such an arrangement is schematically depicted by the frame member 206 in FIG. 1 shown moveable to the safety position represented in phantom at 206'. Such an arrangement is revealed in an elevational sense at 208 in FIG. 2. Looking to FIG. 10, the protective door or frame is revealed in conjunction with an access area. In the figure, the rotational robot carrying bridge or beam is shown at 210 supporting a robot assembly 212 for providing workpiece communication with a machine stage 214. The beam 210 is shown pivoted upon central post support 216 and the robot assemblage 212 is represented as having access to a multi-tier dynamic buffer 218. The machine stage region is shown to provide limited human access by virtue of fencing 220 and 222 and, as a secondary safety aspect, a noted safety frame or door 224 is shown moved over the access region occupied by an operator as shown at 226. The alternate position of the safety frame 224 is shown in phantom at 224'. As an alternate arrangement, the frame 224 may be pivoted into the position shown from a vertical orientation. Additionally, switch actuating floor mats 225 responsive to operator 226 entry may be provided, as well as an operator access switching function is provided at 227 outside of the fence 222.

Looking to FIG. 11, a view of such an arrangement is revealed in schematic fashion. Here, the rotational robot supporting beam is shown at 228 carrying a robot 230 and having an outer end supportably associated with a peripheral support rail 231. Beneath this assemblage are machine stages 232 and 234. The operator access region of machine stage 234 is shown enclosed by a fence structure 236 having a human access gate 238. A safety frame or door 240 is shown positioned over the operator area to physically restrict movement of robot 230. The frame 240 may be manipulated into the noted position from either of two orientations represented in phantom at 240' and 240''.

Turning to FIG. 12, a diagrammatic representation of a control architecture for the manufacturing system of the invention is represented generally at 250. The control system employs a principal or host computer as represented at block 252. This computer incorporates a program which controls the general sequencing of events within the manufacturing system, i.e. controlling the overall flow of workpieces through the manufacturing process. This includes the controlling of the bridge or beam location as well as the selection of robot contained programs. The resultant overall flow control provides for banking of workpieces within the dynamic memory as well as accommodating the movement thereof between transfer stations, reacting to rejected parts and machine stages which are down. In effect, instantaneous conditions within the manufacturing cell are reacted to under a host computer program. Where appropriate, the selection of machine stage programs also may be provided by this host computer facility. The latter is particularly employed where direct numerical control machines are utilized. However, the robot programs can be selected to carry out similar logic activities. Robot program selection is represented in the drawing by lines 254 and 256 extending to respective blocks 258 and 260 representing the on-board control functions of two robots. Accordingly, the associated robots are represented by line 262 extending to block 264 and line 266 extending from block 260 to block 268. Each robot for the instant illustration is assigned three machine stages or devices. In this regard, robot 268 is assigned the material movement associated with machines 1 and 3 as represented by line 270 and block 272. Similarly, robot 264 is shown to be associated in controlling relationship with machine stages 4–6 as represented by line 274 extending from block 258 to block 276. As represented by lines 270 and 274, the input/output ports of the robot controls 258 and 260 may be employed in and of themselves to carry out necessary machine program selection and signaling. Generally, it will be found convenient to employ the robot control for direct association in machine control. For example, the robot control may be employed with a computerized machine stage to instruct as to machining operations and then provide project initiation or completion information to the host computer at block 252. The I/O ports of the robot may be employed for causing the machine stage door to be opened, to disarm any clamping device therein and remove the workpiece, then change the workpieces and re-enable the clamping devices following which the door is closed and the machine stage again is activated for a next cycle. Robot controls as represented at blocks 258 and 260 generally will have as many as 64 I/O ports for carrying out such instructional activities.

Positioned in association with the host computer block 252 is a programmable logic controller function represented at block 278 which optionally may be employed as a second level computational stage. However, the functions of this logic controller also may be carried out by the host computer as at block 252, thus blocks 252 and 278 are shown associated by dashed line block 280. The programmable logic controller function as represented at block 278 provides a variety of input-/output (I/O input) related control features. For example, as represented at line 282 and block 284 the input-/output function of the manufacturing cell is monitored to indicate the presence of parts for inputting as well a the monitoring of input or output systems as to the type matrix in which to position parts. Bridge position control is provided in terms of drive as represented by lines 286 and 288. The programmable logic controller as at block 278 provides amplified input to servo motors and the like to motors as described at 64 in conjunction with FIG. 4. The position of the bridge as well as other devices such as robots also is carried out by this input-/output function as represented at lien 290 and block 292. This same function may be localized under robot control 258 as represented in phantom at line 290' and block 292'. The degree of position control for the bridge, for example, will depend upon the type of robot employed. Where an articulated arm type as described in conjunction with FIG. 6 is utilized, then the bridge or beam carrying the robot is positioned at a fixed location whereupon the higher flexure of such robots then carries out a detailed multi-degree of freedom movement. However, where telescoping or gantry type robots are employed, then a compound control may be required wherein the bridge or supporting beam becomes part of the workpiece positioning function. For such situations, then a higher level of control feedback as well as drive control is required. Conventional position encoders are employed with the instant system for position monitoring and feedback to associated control components. The input/output function of the controller represented at block 278 also is utilized for controlling safety door circuits and the like assuring a safe access to the machine stage region by operators. This function is represented by line 294 and block 296. Because the manufacturing system is quite flexible, many other machine devices may be controlled form this input/output function as represented by line 298 and block 300. The machine and system control interface is represented at line 302 and block 304. Certain controls to the machine as well as monitoring functions of machine performance generally will fall under the control of the programmable logic controller or host control.

Generally, a machine stage will be activated from the programmable logic controller at block 278 and a robot will commence its workpiece handling function. However, a variety of conditions may intercede falling under the control of host function 280. For example, in the event of a hazardous condition, a signal conventionally referred to as "feed hold" will be sent to the machine stage 304 from the centralized controller function. Generally, the machines are programmed to stop axis motion under such conditions. Often this represents a safer condition than carrying out an emergency, "E", stop. For example a chuck will be permitted to continue to rotate and thus clear chips and the like in appropriate fashion. On the other hand, a cycle stop also may be instructed by the centralized computer function. A cycle start input also may be provided from the host computer or programmable logic controller and an end cycle monitoring function generally will be supplied to that centralized control. Cycle complete information can be employed either from the programmable logic controller or host computer or from the robot controls, i.e. as represented at blocks 258 and 260. Advantage is obtained by employing the latter robot controls for such functions as opening and closing a chuck, providing in/out functions for a tail stock, clamping and unclamping functions, part sensing and the like. Generally, gauging signals will be monitored by the programmable logic controller or host computer as at block 280 to determine the presence of "bad parts". Thus, as labelled in block 304, the programmable logic controller as block 278 or a host computer as at block 252 a well as the robot controls as at blocks 258 and 260 may manage what otherwise are the manual control of a given machine stage and the CNC controls thereof.

Looking to FIG. 13, the control function which may be provided by the I/O devices of the robot as discussed in conjunction with blocks 258 and 260 is again represented at block 306. The figure illustrates typical controls which may be provided from an associated robot. In this regard, a machine door or protective barrier is illustrated at 308 which is actuated from a hydraulic cylinder 310 via linkage 312 and under the control of a valve 314. The association of valve 314 and cylinder 310 is represented by lines 316 and 318. Control over valve 314 and thus door 308 is provided from the robot controlling function as at block 306 as represented by control lines 320, 322, 324, and 326. The position of frame or door 308 is monitored by limit switches as a 328 and 330 shown providing monitoring signals to the robot controller at block 306 via respective lines 332 and 334. These lines are seen to provide an override of the manual machine door opening and closing switch represented at block 336 and logically tapped by earlier-noted lines 320 and 322.

In similar fashion, a chuck function represented at 338 is seen to be controlled by a valve represented at block 340 via an association represented at liens 342 and 344. The valve function 340 is seen controlled via lines 346, 348, 350 and 352 extending between the robot controller function at block 306 and the manual switching function of the machine stage as represented at block 354. Thus, the controller function at block 306 is capable of actuating the chuck function 338 between clamping and non-clamping orientations, a function otherwise carried out manually as represented at block 354. In similar fashion, the tail stock for the exemplary machine stage is represented at 356 under the control of a valving function represented by block 358 and lines 360 and 362. Valve function 358 is seen to be controlled via lines 364, 366, 368 and 370 intercoupling the robot controller function represented at block 306 and a manual switching control tapped thereby at block 372.

With an arrangement as thus depicted, the logic capabilities of individual robots may be accessed for localize control purposes. This permits a more facile development of software and the like, generally avoiding otherwise complex program protocols and the like necessary for the operation of machine centers and the like which may have been procured from diverse manufacturing sources.

Looking to FIG. 14, an enhanced schematic representation of safety door type circuits as discussed in conjunction with block 296 and line 294 in FIG. 12 is portrayed. In the figure, the programmable logic controller as discussed in connection with FIG. 12 again is represented by the same numeration at block 278. The association of controller 278 with the host computer facility is represented at block 252 in FIG. 12 as now represented by dashed line 380 which may, for example, be an RS-232 serial connection Robot control as discussed in conjunction with blocks 258 and 260 in FIG. 12 again is represented at block 382 which also is associated with the host computer facility as at block 252 as represented by line 384. A robot supporting beam or bridge as described at 18–21 in FIG. 1 is represented at 386 as supporting an overhead robot 388 functioning under the robot control represented at block 382 as represented by line 390. The acceptable limit of travel of robot 388 upon beam or bridge 386 may be monitored by a limit switch represented at 392, the output of which is monitored by the programmable logic controller 278 as represented by line 394. A safety door or frame for a given machine stage is represented at block 396 as being actuable between open and closed positions by a cylinder actuated drive assembly as represented at block 398. Assembly 398, in turn, is controlled from a valve function represented at block 400 by an association represented at line 402 and 404. Valve function 400, in turn, is controlled from the programmable logic controller function at block 278 as represented by lines 406 and 408. The open and closed orientations of the safety frame or door 396 are monitored, respectively, by limit switches 410 and 412, the outputs of which are directed to the programmable controller at block 278 as represented at respective lines 414 and 416. An impact or "crash" sensor also is associated with the closed or safe orientation of the safety frame or door 396 as represented at block 418. Any signal representing an impact of the robot 388 with the frame 396 is signaled by this device as represented by line 419 to the programmable logic controller represented at block 278. A manual switch is provided to the operator which is actuable at a position outside of any protective or circling fence as represented at 190 in FIG. 1 then is represented block 420 in the instant figure. Switch function 420 responds to an appropriate one or both of the limit switches 410 and 412 as represented at lines 422 and 424 to provide a visual indicia of the position of the safety door, i.e. red being for a position outside of the machine stage and green for a position of protection within the machine stage region. When the switch is actuated by the operator from without the machine stage region, then such information is transmitted as represented by lines 426 and 428 to the programmable logic control function at block 278 to effect appropriate actuation of the valve 400 and cylinder assemblage 398. The operator then has the opportunity to move the safety door or frame into an appropriate safety position and the programmable logic controller then may effect the opening of an access gate, as described in conjunction with FIG. 1 at 192–204. This gate control is shown in the instant figure as a solenoid actuated locking device represented at block 430 functioning to release a gate represented at 432 under the control of the controller at block 278 as represented by line 434. The status of the gate 432 may be monitored by a limit switch 436 and the status of the gate 432 then can be communicated to the controller function 278 as represented at line 438. The operator as present within the machine stage region once gate 432 is opened by a floor mount switch 440 which provides an appropriate signal of the presence of the operator to the programmable logic controller as represented at line 442.

With the arrangement shown, an operator wishing access into the machine stage region for a given machine stage actuates a switching function 420 so as to cause the controller function 278 to carry out an entrance procedure. The controller's association with the host computer is represented at line 380 and the latter association with robot control as at line 384 functions to cause the robot 388 to move to a parked position or to an orientation servicing other machines. Such parked position may be monitored by limit switch 392. The controller function responds further to effect a movement of the safety frame or door 396 into the machine stage region to thus block any movement of robot 388 thereinto. When the safety door or frame 396 is in place, a visible indicia such as a green light is activated at switching function 420. Additionally, at that point in time the solenoid 430 is actuated by control of the controller 278 to permit opening of gate 432. As the operator opens the gate 432, information to that effect is monitored by limit switch 436 for presentation to controller function 278. Additionally, as the operator enters the maintenance region of the instant machine stage, such entry will be signalled to the program controller by the floor mat switch 440. Of course, any movement of the robot 388 under improper control conditions toward the region being maintenanced would be blocked by the safety frame, door and or barrier such movement is detected by the impact sensor 418 for appropriate corrective procedure. Essentially the opposite logic obtains upon the operator leaving the machine stage region at hand.

The use of centrally disposed pivot posts as at 26 in FIG. 2 provides important fabricational advantages in producing the manufacturing system 10. For example, tolerancing is easier to achieve and a tendency for bridges or beams of full diametric extent to become misaligned and lock-up is more readily avoided. Further the use of an entrapped way connection with the robot carrying beams is avoided. The center post also suppresses robot load induced bending movement in the supporting movable beams. Looking to FIGS. 15, and 16, an arrangement whereby a central supporting post may provide pivotal support while permitting a robot to traverse the entire diametric extent of a manufacturing system such as at 10 in FIG. 1 is portrayed. In the figure, a robot 450 is shown having its translational drive assembly 452 moveably supportably mounted over a bridge beam 454. Beam 454 extends the entire diametric extent across a circular manufacturing system installation as at 10 in FIG. 1. To provide central pivot support for the beam 454, however, a C-shaped pivot support 456 is provided. Support 456 is seen to have a central pedestal or base 458 which is floor mounted and supports a pivot bearing 460 at its top. Attached to the bearing 460 is a C-shaped or offset vertically oriented structural extension 462 having a base 464 coupled to bearing 460 and pivotal thereabout, an upstanding vertical support 466 and an inwardly directed top beam supporting portion of horizontal orientation 468. Portion 468 is seen fixed to the center point of beam 454. With the arrangement shown, the robot 450 may traverse the entire diametric extent of beam 454. An additional robot may be coupled to the pivot support 456 having the extent of a radius of the system 10 at hand. This will provide a 90° access with the second robot which may operate in concert with the robot 450, operating simultaneously along a full diametric beam extent.

Figure 17:
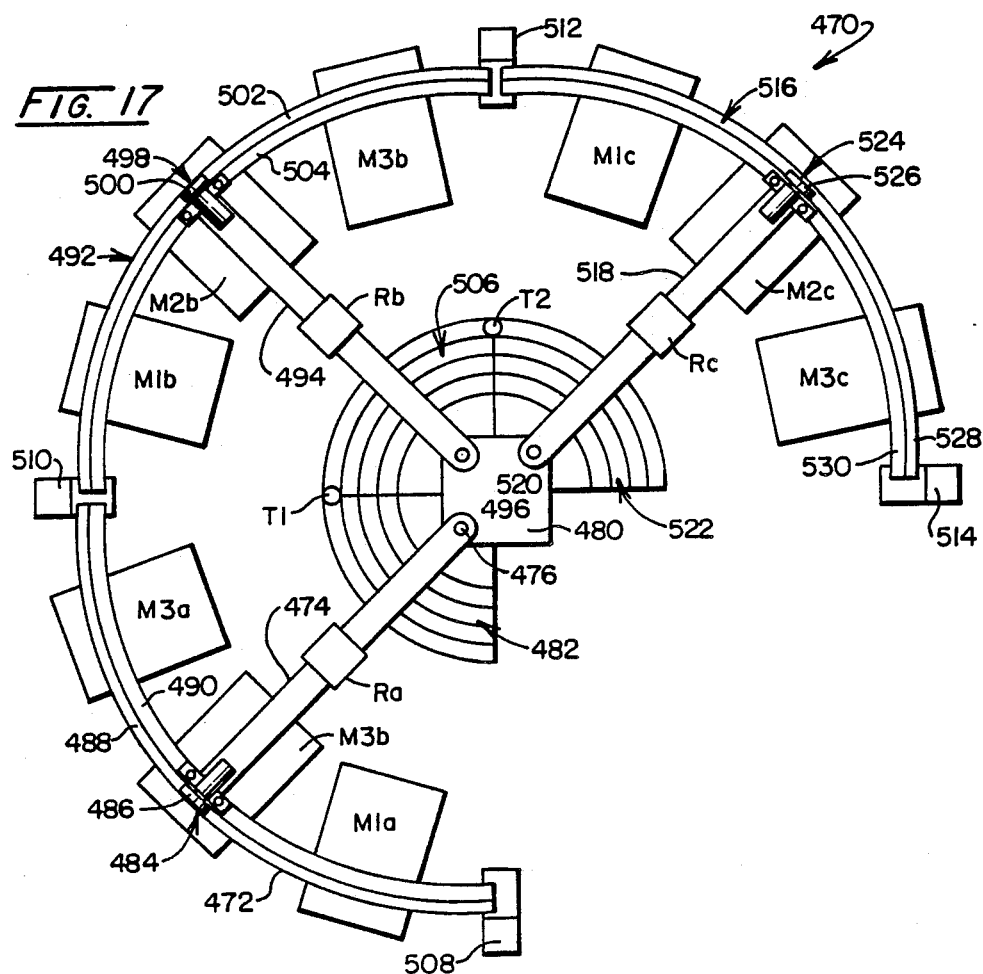
FIG. 17 is a top schematic view of an embodiment of the system of the invention wherein independent overhead bridge beams service quadrant regions of a machining area.
Figure 18:
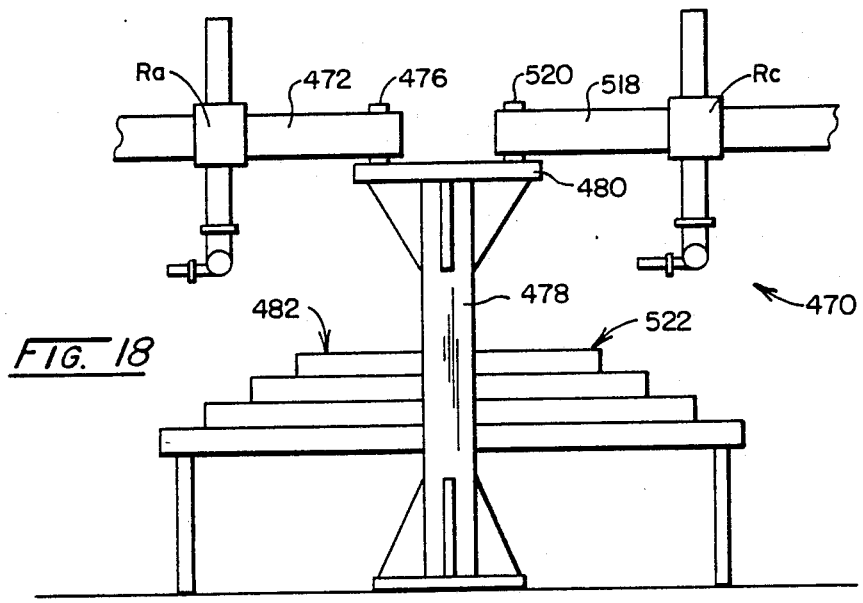
FIG. 18 is a partial sectional view showing the central post support of the arrangement of FIG. 17.

The entire periphery of a generally circular machine stage region need not be employed in each installation of the manufacturing system of the invention. In this regard, the system may be segmented, employing pivoted bridge beams or the like but with offset pivot points to derive shorter sector radii. Looking to FIGS. 17 and 18, such an arrangement is revealed. In FIG. 17, the machining system represented generally at 470 is seen to be formed of three discrete segments, the first of which is formed of peripheral rail 472, bridge beam 474, and beam internal pivot 476. Looking additionally to FIG. 18, the pivot 476 is seen to be supported by a central support post 478 which is configured having a pivot bearing platform 480 serving to support the bearing and pin connection 476 for beam 474. Returning to FIG. 17, bridge beam 474 is seen to support an overhead robot $R_a$ over a dynamic buffer sector 482 which, for example, may be of the multi-tiered variety as disclosed in FIG. 1 at 14. Beam 474 is driven by a motorized drive assembly 484 which may be fabricated in similar fashion as that shown at 42 in FIG. 1 and described in detail in FIGS. 3 and 4. In this regard, the outer drive wheel 486 of the assembly 484 is in frictional contact with the outwardly disposed upward surface 488 of rail 472. In similar fashion, a smooth way 490 provides a bearing surface for the outer end of bridge beam 474 and motor assembly 484. Robot $R_a$ and associated beam 474 function to service a sequence of machine stages such as shown at M1a–M3a in conjunction with dynamic buffer segment 482 and a transfer station, T1.

In similar fashion, a second segment may be provided incorporating a peripheral rail 492 operating in conjunction with a bridge beam 494 carrying overhead robot $R_b$ and pivotally moveable from a pivot bearing 496 coupled to central support posts pivot varying platform 480. Beam 494 is driven along rail 492 by a motorized drive assembly 498 having an outer drive wheel 500 engaged with an outer surface 502 of peripheral rail 492. The motor assembly 498 further is supported upon a smooth way 504 supported upon the upward surface of rail sector 492. With the arrangement, the beam 494 and robot $R_b$ service, for example, three machine stages M1b–M3b in conjunction with transfer stations T1 and T2 and a dynamic buffer segment 506, which is, in effect, a continuation of the dynamic buffer segment 482. It may be further observed that peripheral rail 488 is supported in overhead fashion by columns 508 and 510, while peripheral rail 492 is similarly supported between column 510 and a column 512. Column 512 and a next adjacent column 514 serve to support the peripheral rail 516 of a third sector of the manufacturing system 470 which further incorporates a bridge beam 518 supported between the latter rail and a pivot bearing 520 supported upon the pivot bearing platform 480 of central post 478. Bridge beam 518 is seen to support an overhead robot $R_c$ above a dynamic buffer segment 522 for the purpose of servicing machine stages, for example those three stages labelled M1c–M3c and transfer station T2. Beam 518 is independently driven by motorized drive assembly 524, the outer drive wheel 526 of which engages the outwardly disposed arcuate region 528 of rail 516. Assembly 524 is supported upon a smooth way 530 formed upon the inwardly disposed arcuate upper surface of rail 516.

With the arrangement shown, a flexibility in the size of the manufacturing system 470 may be provided in consonance with the requirements of any given manufacturing need. Thus, segments can be added or deleted depending upon the instantaneous requirements of the manufacturing facility while taking advantage of the dynamic buffer approach of the system.

Looking to FIG. 19, an adaptation of the instant dynamic buffer system to enhancing the throughput rate of a gantry type manufacturing system is revealed generally at 536. In the figure, a first component of the system 538 is formed of the gantry bridge rails 540 and 542 which function to support two overhead gantry bridges 544 and 546. The latter bridges respectively carry translational moveable overhead gantry robots R1a and R2a such that each services select machine stages within the grouping M1a–M5a. To facilitate this servicing of the machine stages, a dynamic buffer 548 is provided. However, as represented by dual directional arrow 550 the buffer 548 is a moveable conveyor such that workpieces can be maneuvered along the gantry bay of first component 538. Thus, the workpiece accessing time of the robots R1a and R2a may be diminished. First component 538 of the system 530 performs in consonance with a second component 552 representing as second gantry bay comprised of overhead support rails 554 and 556 which, in turn, support two gantry bridges 558 and 560. Gantry bridges 558 and 560 carry respective robots represented at R1b and R2b for servicing a linear sequence of machine stages M1b–M5b. However, servicing of these machine stages occurs in conjunction with the same dynamic buffer 548 as employed with component 538. Thus, parts are transferred by the dynamic buffer 548 between components 552 and 538 to enhance the productivity and throughput rate of the gantry form of the manufacturing system.

Figure 20:
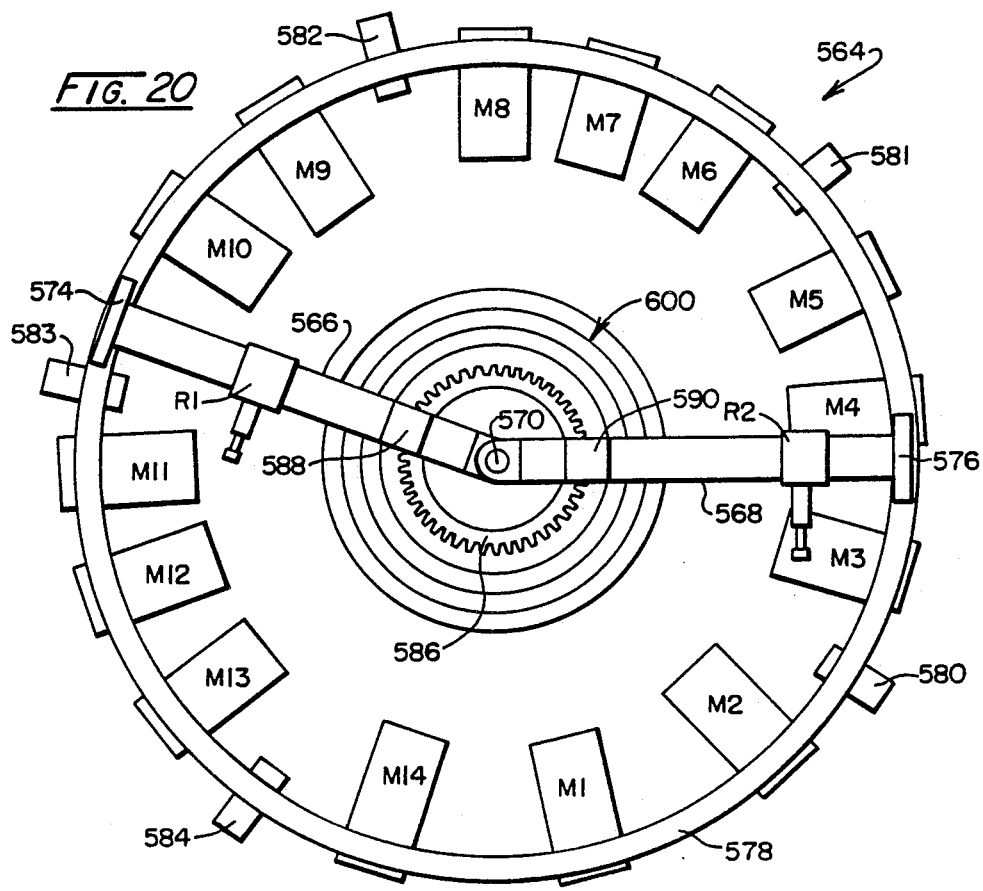
FIG. 20 is a top schematic view of a manufacturing system, according to the invention showing independent bridge beams operating from a common pivot axis.
Figure 21:
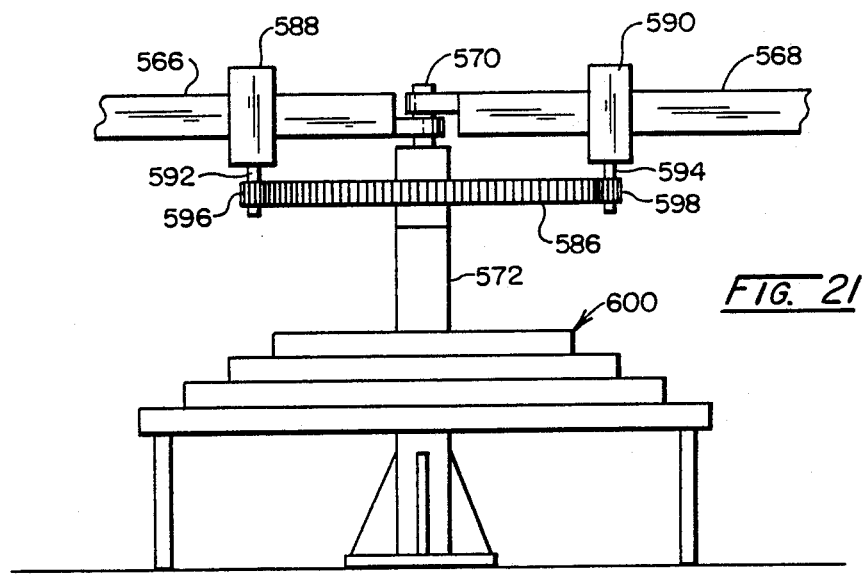
FIG. 21 is a schematic partial side elevational view of the manufacturing system of FIG. 20.
Figure 22:
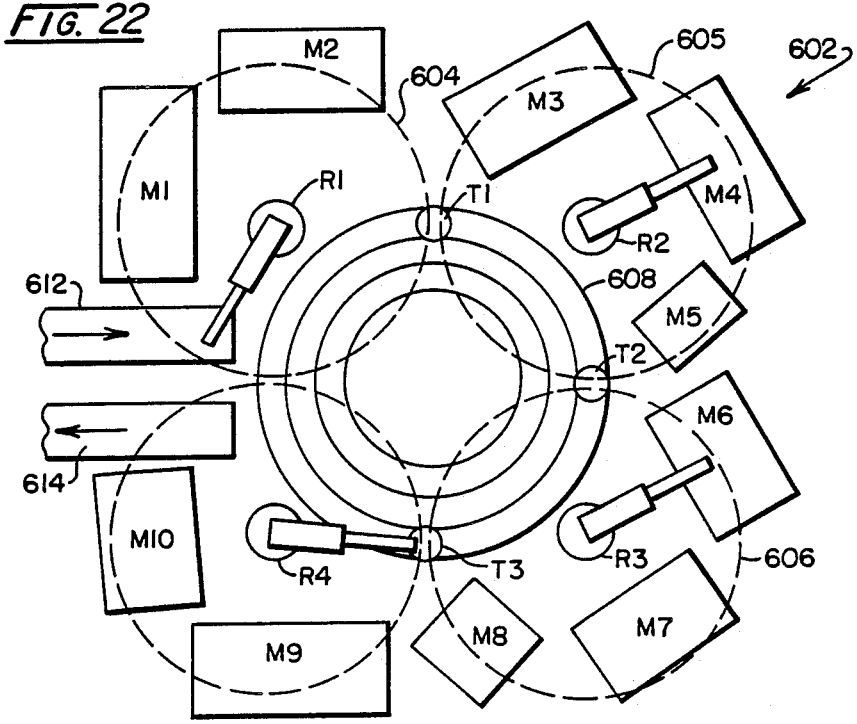
FIG. 22 is a top schematic view of a manufacturing system employing floor mounted robots in conjunction with a dynamic buffer region.

The independent bridge beam implementation of the instant system also maybe employed with the circular machine staging system as described in conjunction with FIG. 1. Looking to FIGS. 20 and 21, such an independent approach is revealed in general at 564. Manufacturing system 564 includes two independently moveable bridge beams 566 and 568 which respectively carry transversely moveable overhead robots R1 and R2. Bridge beams 566 and 568 are mounted upon a common pivot bearing 570 as seen in FIG. 22 which, in turn, is supported by a centrally disposed post 572. The outer ends of bridge beams 566 and 568 respectively are supported by idling support trucks 574 and 576 which ride upon the smooth upwardly disposed way surface of a circular outer peripheral rail 578. Rail 578, in turn, is supported in an elevated orientation by columns as at 580–584. While independent drive assemblies as discussed in conjunction with FIGS. 3 and 4 may be employed with each of the bridge beams 566 and 568, for the instant embodiment, an inwardly disposed drive is provided which includes a horizontally disposed ring gear which, as seen in FIG. 21, is fixed to the upward region of post 572. Drive motors 588 and 590 are fixed to respective beams 566 and 568 and, are shown in FIG. 22 as having respective drive shafts 592 and 594 carrying pinion gears 596 and 598 for enmeshment with the corresponding teeth of ring gear 586. Thus mounted, the robots R1 and R2 function to serve select machine stages of the grouping shown at M1–M14 in conjunction with a tiered type dynamic buffer 600 which, for example, may be the type described at 14 in FIGS. 1 and 2. The articulated arm robot as described in conjunction with FIG. 6 exhibits operational characteristics permitting it to manipulate workpieces with greater speed and freedom, however, at a penalty currently experienced of lower workpiece weight capacities. Where the manufacturing system is called upon to produce at relatively high rates in conjunction with workpieces of such lower weight, then advantage can be taken of the dynamic buffer of the instant system in conjunction with floor or pedestal mounted articulated robots. Looking to FIG. 22, such a manufacturing system having four quadrants of manufacturing cells is revealed at 602. The system 602 includes four robots R1–R4 which are floor or pedestal mounted and which are seen to perform within respective operational areas 604–607. A common dynamic buffer area 608 is provided having a multi-tiered configuration as described at 14 in FIGS. 1 and 2, while inputting and outputting of workpieces into the system 602 is provided by input conveyor 612 and output conveyor 614. An enhanced part movement flexibility may be realized by providing for the rotation of some or all of the ring shaped tiers of dynamic buffer 608.

With the arrangement shown, workpieces entering system 602 from conveyor 612 are accessed by robot R1 for delivery to machine stages M1 or M2 as well as transfer station T1 within the dynamic buffer 608. The next manufacturing quadrant cell incorporates robot R2 which accesses workpieces at transfer station T1 or, optionally, station T2 to present them in appropriate systematic fashion to machine stages M3–M5. Correspondingly, the third quadrant manufacturing cell incorporating robot R3 functions in conjunction with transfer stations T2 and T3 to provide workpiece input and output to machine stations M6–M8. Finally, the fourth manufacturing quadrant cell incorporating robot R4 functions to service machine stages M9 and M10 and operates in conjunction with transfer station T3 as well as with the output conveyor 614. Generally, safety frames and the like are not employed with systems as at 602, a manufacturing quadrant cell being shut down where maintenance is required. However, the dynamic buffer 608 may provide for part storage retrieval and transfer to maintain system operation even though one robot may be in a down condition. Both speed and flexibility for such down conditions can be enhanced by providing the dynamic buffer 608 as having rotational features either in tiers as a flat region. Thus, transfer stations themselves can be altered, moved and the like.

High speed systems employing articulated arm robots may further be expanded in terms of machine stage capacity and efficiency of workpiece manipulation through the employment of an overhead mounted robot system operating in conjunction with a dynamic buffer according to the instant invention. Looking to FIG. 23, such a manufacturing system is represented in general at 620 containing six discrete machine stages incorporating floor mounted or pedestal mounted articulated arm robots R3–R8 operating within robot arm access areas respectively encircled at 622–627. A multi-tier dynamic buffer 630 similar to that described at 14 in FIGS. 1 and 2 is positioned centrally of the region 622–627 and is serviced by articulated arm overhead robots R1 and R2 mounted upon bridge beam 632. Beam 632 is centrally, pivotally mounted at post 634 and is driven by a drive assembly 636 having a drive wheel 638 in frictional engagement with the outer surface 640 of circular overhead rail 642. As before, an inwardly-disposed way 644 provides a smooth bearing surface for the bearing component of drive assembly 636 as well as for an idler bearing wheel 648 positioned at the opposite side of beam 632. Rail 642 is held in its overhead position by columns (not shown) and extends sufficiently over the individual robot access manufacturing cells so as to be capable of positioning parts at feed stations B1–B6.

In its general operation, the system 620 employs robot R3 for purposes of accessing parts inputted by an input function 650 which may be provided, for example, as a conveyor, pallet system or the like. The workpieces accessed by robot R3 then are presented in a predetermined sequence to machine stages M1 and M2 as well as to a transfer station T1 of the sequence T1–T5 thereof. The input station B1 may be employed in conjunction with robot R1 for necessary manufacturing sequence alterations. Robot R4 functions to receive workpieces from transfer station T1 and/or input station B2 for purposes of providing workpieces access to machine stages M3–M5 and functions additionally to position stage-completed workpieces at transfer station T2. Transfer station T2 is accessed by robot R5 for performance in conjunction with machine stages M6–M8. The robot R5 also may perform in conjunction with input station B3 as serviced by robot R2 and functions to position completed workpieces at transfer station T3. Robot R6 accesses workpieces from transfer station T3 or from station B4 as accessed by robot R2 in an appropriate sequence to machine stages M9–M11. The completed workpieces then are positioned at transfer station T4 for access by robot R7 which also may access the input station B5 as serviced either by robot R1 or R2. Robot R7 functions to position workpieces in an appropriate sequence at machine stages M12–M14 and a completed workpiece then is positioned at transfer station T5 for access by adjacent robot R8. Robot R8, in turn, functions to access workpieces from transfer station T5 or, alternately, robot R1 supplies workpieces at input station B6. The robot serves to feed machine stages M15 and M16 as well as an output function 652 which, for example, may be provided as a conveyor counting system or the like. As is apparent, the system 620 enjoys a significant flexibility, providing for workpiece storage and retrieval, machine cell substitution during down times and the like. It may be observed that the dynamic buffer region 630 may be employed additionally for the transfer station (T1–T5) function. Generally, a robot R3–R8 will be shut down for any given down time and the indexing system comprised of robots R1 and R2 will maintain workpiece flow for the system with the remaining operational floor mounted robot of the grouping R3–R8.

Figure 24:
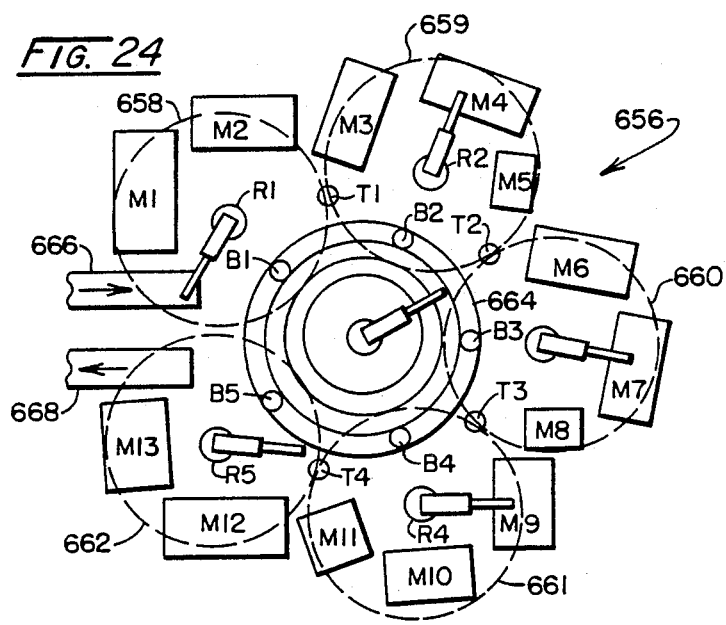
FIG. 24 is a top schematic view of another embodiment of the manufacturing system of the invention showing a floor mounted robot servicing machine stage grouping along with a dynamic buffer having a floor mounted robot at its center.

Referring to FIG. 24, still another manufacturing system intended for use with floor or pedestal mounted articulated arm robots for high speed manufacturing pass-through is revealed in general at 656. The system 656 is seen to incorporate, for example, five robots R1-R5 in a grouping of manufacturing cells having circles of influence represented by respective—circular peripheries 658-662. These operational peripheries 658-662 are seen to overlap the outer periphery of a multi-tier dynamic buffer 664 such that robots R1-R5 may access respective buffer input/output positions B1-B5. Buffer 664 incorporates a pedestal or floor mounted articulated arm robot R6 at its center which serves to move workpieces to appropriate storage locations and back from the buffer input/output locations B1-B5. A workpiece input function is shown at 666 which may be a conveyor, palleting system or the like functions to provide input access by robot R1 of the system 656. Robot R1 operates in conjunction with dynamic buffer access position B1, machine stages M1 and M2 as well as a transfer station T1 to provide a first manufacturing cell of a sequence thereof. Workpieces transferred to transfer station T1 may be accessed by articulated arm robot R2 for feed and retrieve from machine stages M3-M5 as well as for accessing such workpieces with respect to the dynamic buffer 664 at buffer access region B2. Completed workpieces may be transferred to a transfer station T2 for access by the next succeeding manufacturing cell incorporating articulated arm robot R3. Robot R3 accesses transfer station T2, the dynamic buffer 664 access position B3 as well as machine stages M6-M8 to provide a manufacturing cell completed workpiece at transfer station T3. Transfer station T3, in turn, is accessed by articulated arm robot R4 for maneuvering the workpieces through a predetermined sequence of manufacturing stages represented at M9-M11. Robot R4 also accesses the dynamic buffer 654 from accessing position B4 and provides manufacturing cell completed workpieces at transfer station T4 for subsequent access by articulated arm robot R5. Robot R5 accesses workpieces from transfer station T4 as will as the buffer access region B5 to provide for the treatment thereof at machine stages M12 and M13 as well as to offload completed workpieces from the system 656 onto an output function 668 which may, for example, be provided as a conveyor palletizing system or the like.

Looking additionally to FIG. 25, a schematic partial sectional view of the system 656 is revealed showing dynamic buffer robot R6 and robot R1 along with machine stage M1. The dynamic buffer region 664 is seen to be multi-tiered in a concave sense incorporating a tier 670 at the highest elevation and most distant from the pedestal of the robot R6, while the final tier 673 is shown closest to the pedestal of the robot. With the arrangement, the robot R6 will maneuver workpieces from such stations as at B1 into computer directed storage positions and back for access by the peripheral machine manufacturing cell robots as at R1 seen accessing a workpiece from region B1. The inverted arrangement of tiers 670-673 assures that articulated arm robot R6 can access maximized portions of the dynamic buffer region 664.

Referring to FIG. 26, another adaptation of the manufacturing system of the invention is revealed at 678. The system 678 utilizes four manufacturing cells incorporating robots R1-R4 which are transversely moveable along floor mounted tracks shown, respectively, at 680-683. Alternately, such robot mounting may be overhead. Robot R1 is seen to be pivotally operational within a circular periphery which, for a mid-track position is represented at 686. However, the movement of robot R1 along the track, for example, to position R1' extends its manipular range, for example, to the periphery shown at 686' or as shown at the opposite end of track 680 and at R1" to a circular periphery 686". Such movement along the track 680 permits servicing both the input and output functions 688 and 690 which may be provided, for example, as a conveyor pair, palleting system or the like. Alterntely, these functions may be positioned as shown at 688' and 690'. Robot R1 also functions to service the initial and last machine stages shown, respectively, at M1 and M11 of the system 678. The dynamic buffer region is shown as a tiered arrangement 692 operating in concert with a centrally disposed floor mounted or pedestal robot R5 in fashion similar to the buffer 664 described in conjunction with FIGS. 24 and 25. Any of the earlier-described dynamic buffer techniques may be employed for the system 678, for example, that shown in conjunction with FIGS. 1, 16, 17, 21, 23, 24 and 25, the latter being considered the more versatile arrangement. The buffer 692 is generally within the access area of robot R1 through a substantial portion of the traverse of the track 680. For the normal flow of workpieces, transfer stations T1 and T4 are accessed by robot R1.

In similar fashion, robot R2 provides a moveable circular periphery of manipular capability as represented by dashed line 694 as it maneuvers along track 681. The robot R2 is shown servicing machine stations M2 through M4 as well as transfer stations T1 and T2 at the ends of track 681. In the course of its movement, the robot R2 further accesses and performs in conjunction with dynamic buffer region 692.

Robot R3 is seen to have a moveable circular periphery of manipular influence 696 permitting it to access transfer stations T2 and T3 as well as machine stages M5 through M7. The robot performs in conjunction with the dynamic buffer 692. Finally, robot R4, maneuverable along track 683 to provide a moveable circular periphery for workpiece manipulation shown at dashed line 698, functions to service machine stages M8 through M10 as well as transfer positions T3 and T4. The robot R4 also accesses dynamic buffer region 692 which, for the instant illustration, is shown operated in dynamic fashion through the utilization of centrally disposed robot R5 in the manner described in conjunction with robot R6 in FIG. 24.

In the operation of the system, for example described at 10 in FIGS. 1 and 2, an initialization procedure as employed at the commencement of any given job or batch production procedure. Generally, the first machine stage completion of the last workpiece may provide a signal which is identifiable to alert the operator of the availability of the system for programming to a next batch manufacturing procedure. Generally, the initialization procedure carried out by the operator will involve the entry of part numbers, job numbers, quantities involved and instructions as to the type of input and output procedures as well as machine, bridge and robot operations. Where retooling is called for, a safe machine condition is called for.

Figure 27A:
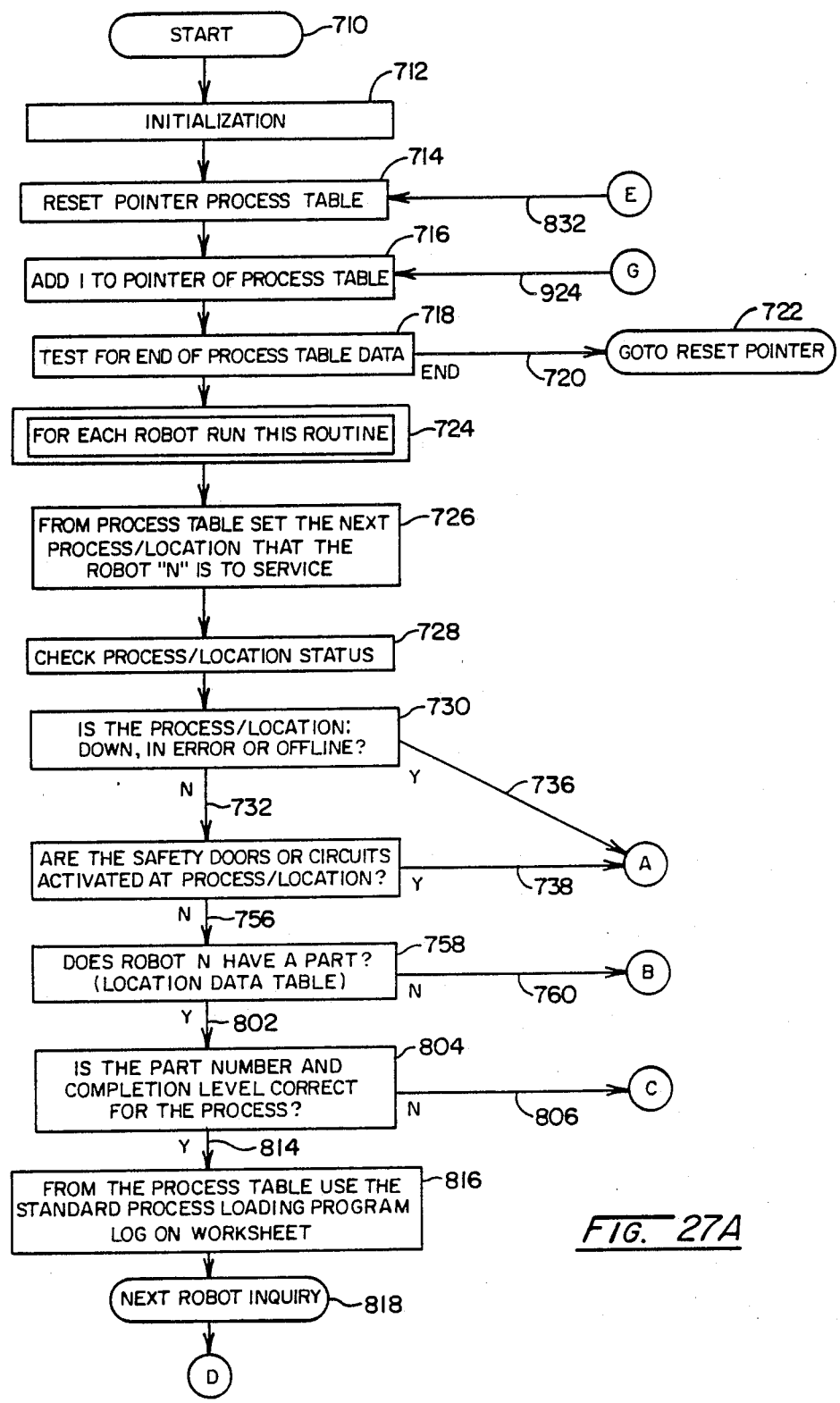
FIG. 27A-27E combine to show an overall control system flow chart employed with the manufacturing system of the invention.

Looking to FIG. 27A, a flow chart of computer directed activity is seen to commence with a start node 710 whereupon the procedure will respond to the above-noted initialization activity as represented in the activity flow by block 712. Generally, the system employs a process table which is a memory retained sequence of processing events involving the identification of robots, machine stages, machine stage discrete programs employed, robot location, machine buffer or bank locations and the like. As represented at block 714, the program commences with resetting a pointer at the top of this process table. The program then continues as represented at block 716 to increment the pointer of this process table to the first step in the procedure of manufacture. As represented at block 718 a test also is made for the end of the process table and, as represented by line 720 and node 722, where the end of the process table is reached, the program reverts to reset the pointer at the top of the table as discussed in conjunction with block 714.

Figure 27B:
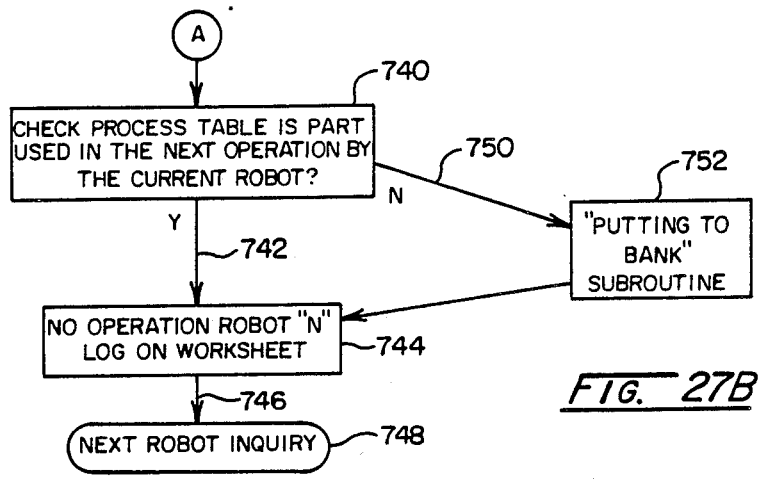

The flow chart then continues with a general instruction that each robot, for example each of four as disclosed in the embodiment of FIGS. 1 and 2 is to run the ensuing routine commencing with block 726. The latter block calls for accessing the process table to obtain the next process/location that the robot under consideration, identified as "N" is to service. Process/location will be a machine stage, input or output function or a position assigned under the instant batch program within the dynamic buffer region or bank. The program then proceeds as represented at block 728 to check the process/location status. This is a preliminary determination made before the bridge and robot are activated and performs in concert with the instructions of block 730 providing the inquiry as to whether the process/location or machine stage is down or is in error or is off line. In the event that it is not, then as represented at line 732 and block 734, a determination is made as to whether the safety doors or safety frame as well as safety monitoring circuits are activated at the anticipated process/location. In the event of an affirmative determination at block 730 or at block 738, as represented at respective lines 736 and 738 leading to node A, a procedure for exceptions to what may be considered normal operation is entered into. Looking additionally to FIG. 27B, these exceptions procedures are detailed. In the latter figure, node A is seen to lead to the instructions at block 740 wherein the process table is accessed to determine whether the workpiece or part under consideration may be used in a next subsequent machine stage. Thus, alternate instructions can be developed to maintain the operation of the manufacturing cell. Accordingly, where an affirmative determination is made, as represented at line 742 and block 744 a "no operation" instruction is developed wherein the robot in question identified as noted above as "N" does not carry out the immediate assignment and a scratchpad type memory identified as "worksheet" will evolve an alternate procedure. The program then continues as represented at line 746 and node 748 to cycle to the next robot inquiry which commences at block 724 as described in conjunction with FIG. 27A. In the event that a next machine stage cannot employ the workpiece or part, then as represented by line 750 and block 752, a "put to bank" subroutine is called which provides for placing the part in the dynamic buffer or bank. The program then continues as represented by line 754 to develop a no operation for the instant robot as described in conjunction with block 744.

Figure 27C:
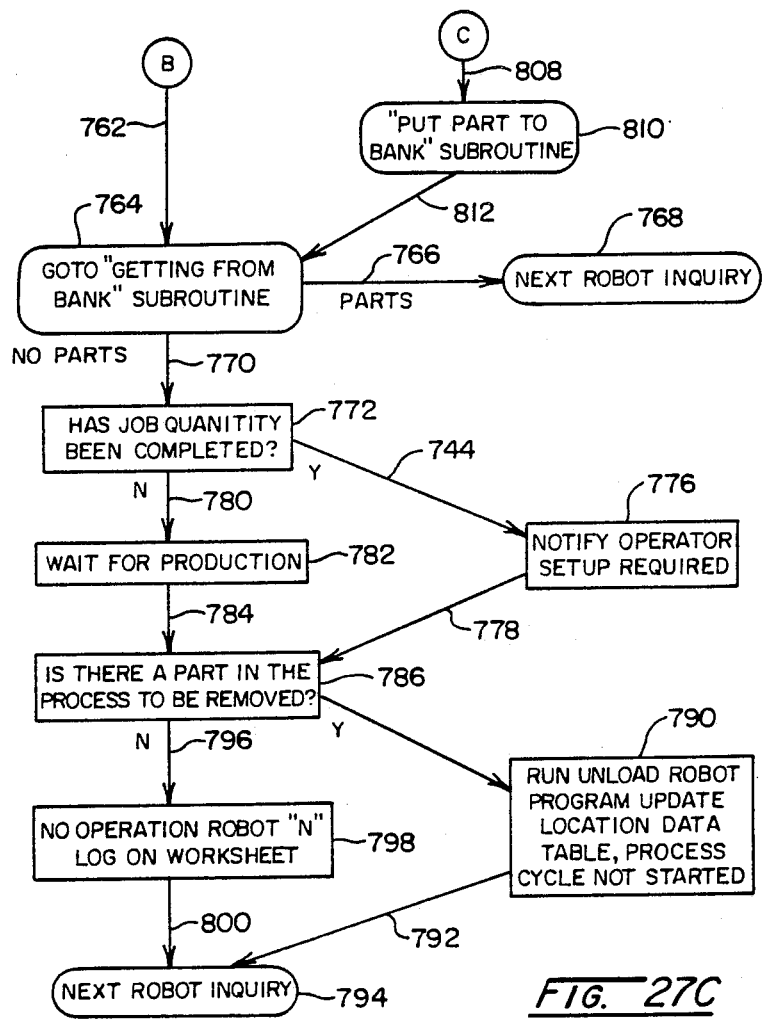

Returning to FIG. 27A, in the event that the safety criteria of the system indicates that a safe condition for robot activity is at hand, then as represented at line 756 and block 758, a determination is made as to whether the robot under consideration, i.e. robot "N" has a workpiece available for maneuvering. In the event that it does not, then the dynamic buffer or bank will be considered for providing such a workpiece. In this regard, a negative determination with respect to the inquiry at block 758 is treated as represented by line 760 and node B. Looking additionally to FIG. 27C, line 762 is seen extending from node B to the instructions at block 764 providing for the accessing an appropriate workpiece or part from the dynamic buffer or bank. Where such parts are available, then as represented by line 766 and block 768, the program reverts to consideration of the next robot of the system as described in conjunction with block 724 in FIG. 27A. Where no parts or workpieces are available within the dynamic buffer, then as represented by line 770 and block 772 the system is interrogated to determine whether or not the job or batch manufacturing increment at hand has been completed. If that is the case, as represented by line 774 and block 776, the operator is notified such that a next batch production may be developed or set up. The process then continues as represented at line 778. Where the instant batch process has not been completed, the requisite part production may be behind one or more machine stages in the established sequence. Where that is indeed the case, then as represented at block 782, the process waits for production to develop the workpieces necessary. For this condition, the robot is caused to remain inactive. The procedure then continues as represented by line 784 and block 786 where a determination is made as to whether a workpiece or part remain stranded in the machine stage under consideration. Where that is the case, then as represented by line 788 and block 790 the pertinent robot is directed to unload the workpiece. A location data table update is carried out to indicate the completion level for the workpiece at hand and the process cycle for the machine stage involved is not activated. The program then continues as represented at line 792 to a next robot inquiry as represented at block 794 and as described at block 724 in FIG. 27A. Where the inquiry represented at block 786 indicates that not part or workpiece is to be removed, then as represented by line 796 and block 798 a no operation condition is considered to obtain and an appropriate log is made to the worksheet memory of the system. The program then continues as represented at line 800 to the next robot inquiry as represented at blocks 794 and 724.

Returning to FIG. 27A, where a workpiece or part is appropriately available for the robot under consideration, then as represented by line 802 and block 804 a determination is made as to whether the part or type number assigned to the part or workpiece and the data identifying its completion level are correct for the process to which it is to be submitted. In the event this not the case, then as represented at line 806 and node C, the part is submitted to dynamic buffer storage, i.e. to a bank. Looking momentarily to FIG. 27C, line 808 is seen extending from node C to the instructions at block 810 calling for a "part to bank" subroutine which provides for carrying out such storage. As represented by line 812, the program then continues with the instructions at block 764 for obtaining a replacement part from the dynamic buffer for continuing the process.

Returning to FIG. 27A, where the part number and completion level for the instant stage are correct, then as represented by line 814 and block 816 the process loading program is implemented for a machine stage or location at hand and historical data for that part are logged on the worksheet component of memory. The program then carries out the same sequence of operations as represented by the next robot inquiry step represented at block 818, the above procedures being reiterated for each of the robots in the operation, for example robot R1 through R4 of the manufacturing system embodiment 10 described in conjunction with FIGS. 1 and 2.

The program then continues as represented by node D.

Figure 27D:
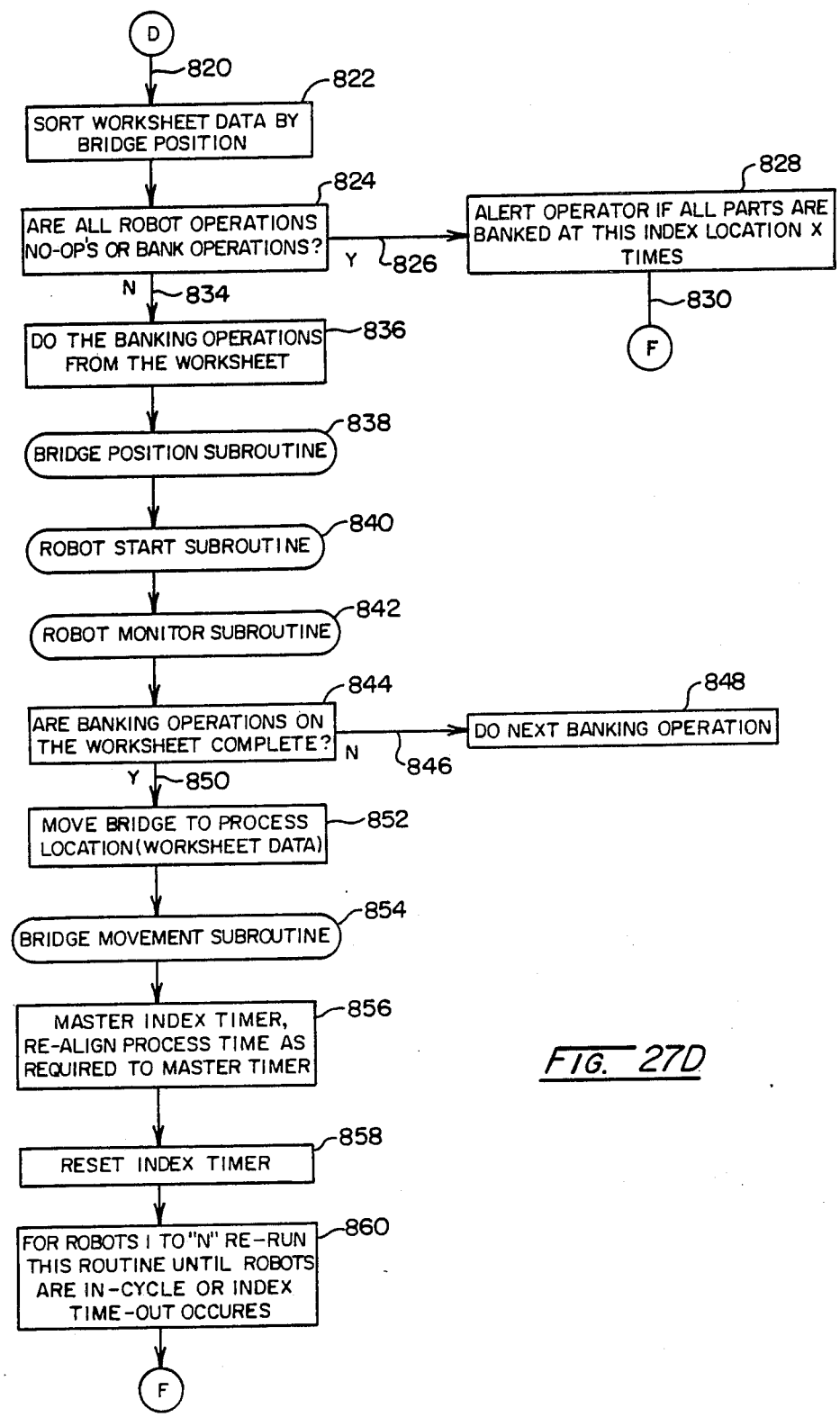
Figure 27E:
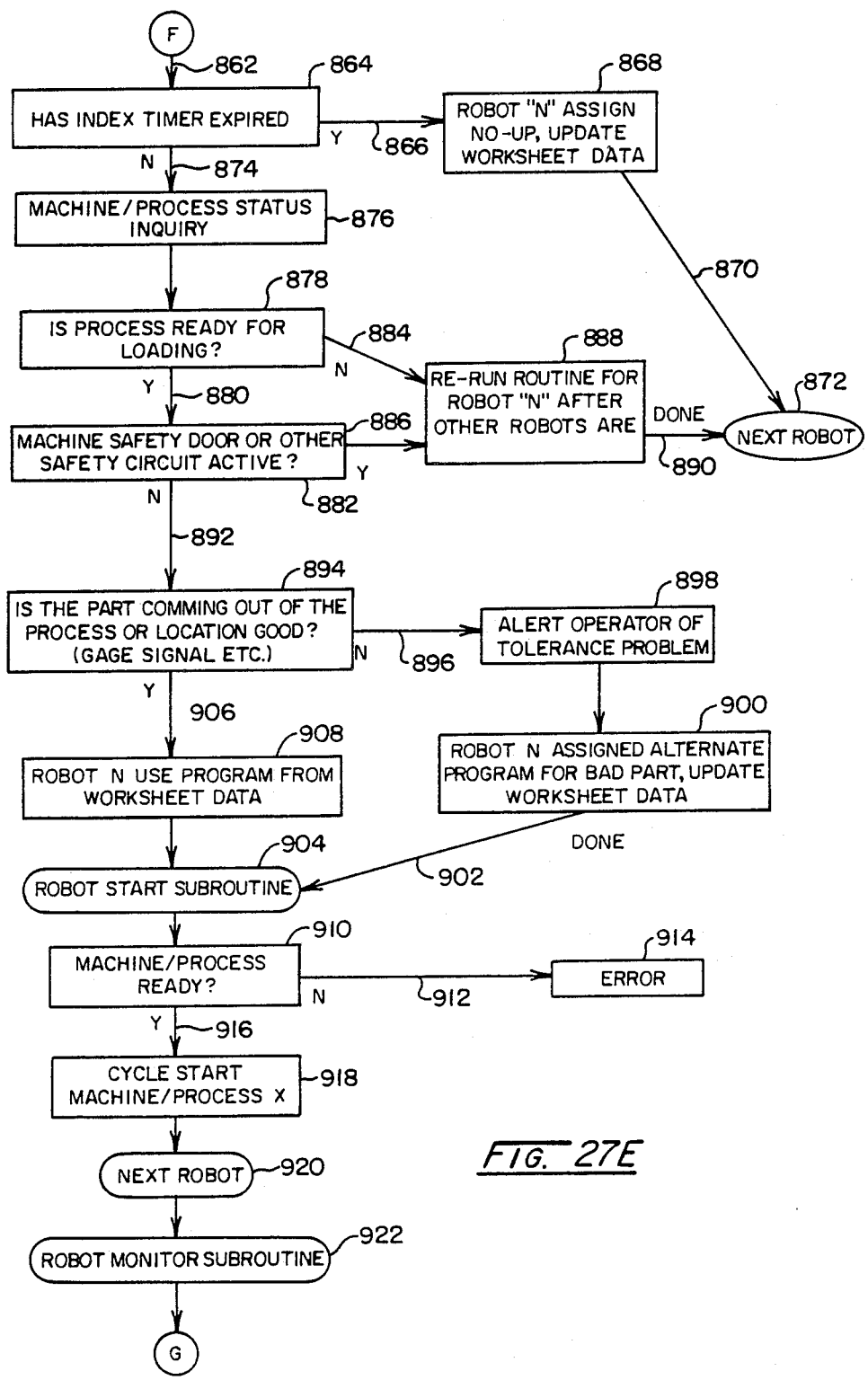

At this juncture in the control operation, each of the robots employed in the system will have been prepared for a next maneuver, if called for. Referring to FIG. 27D, node D again appears and line 820 extending therefrom leads to construction at block 822 providing for the sorting of memory retained worksheet data by bridge position. For example, where activity involves the dynamic buffer, data which are sorted involve the operations to be carried out with respect to the most efficient position of the overhead bridge. Accordingly, when employed with the circular dynamic buffer, the angular position of the bridge vis a vis that buffer is considered and the sequence of bridge positions necessary for the robots is established. The operation then continues as represented at block 824 where a determination is made as to whether the robot operations called for are "no ops" or stand-by conditions or involve operations wherein the dynamic buffer or bank is employed. Where that is the case, then as represented by line 826 and block 828 an alert is made to the system operator in the event that the workpieces or parts are submitted to dynamic buffer or bank for a given index location a certain number, "X" of times. In this regard, where all machine stages exhibit a condition wherein all workpieces are to be positioned within the buffer, then an alarm condition may be at hand. With the noted alert, as represented at line 830 and node E, the program returns to block 714 as described in FIG. 27A as represented by a reproduction of node E and lead line 832.

Where a negative determination is made in conjunction with the inquiry at block 824, then as represented by line 834 and block 836, the system then undertakes to carry out requisite operations with respect to the dynamic buffer regions which are referred to as "banking operations". As part of these operations, a bridge position subroutine is called as represented at block 838 as well as a robot start routine which follows the positioning of the overhead bridge as represented at block 840. During the latter operations, robot activity is monitored in accordance with a robot monitor subroutine as represented at block 842. The program then determines whether all of the called for banking operations have been completed as represented at block 844. In the event that they have not, then as represented by line 846 and block 848, the next banking operation is carried out. Where all banking operations are complete, then as represented by line 850 and block 852, the bridge is moved to load a process/location in accordance with the memory retained worksheet data and, as represented at block 854, the bridge positioning subroutine is carried out. The program then activates a master index timer with respect to the process/location at hand. This is a time of process or machine cycle time arrangement wherein a failure to complete a cycle within the predetermined cycle time will forebode a machine stage fault. Such timing also is employed for conditions in which machine stages are skipped and excess time becomes a factor in evaluating overall manufacturing system performance. Where an excessive amount of time is spent at a given loading position, then as represented at block 858, at the conclusion of a cycle the timer is reset for the next maneuver. The program then continues as represented at block 860 to rerun the above routine until the robots are in the cycle or until the occurrence of an index time out. The program continues as represented at node F which reappears at FIG. 24E. Referring to the latter figure, line 862 leading from node F leads to the instructions at block 864 wherein a query as to whether the index timer has expired is made. In the event that a time-out is at hand, the system has dwelled at one index point too long. As a consequence, as represented at line 866 and block 868, a no operation (NO-OP) assignment is made to the robot in question and the worksheet memory retained data are updated with that information. The program then continues as represented at line 870 and instructional node 872 to commence performance with the next robot in sequence.

Where the query represented at block 864 results in a negative determination, then as represented by line 874 and block 876 the status of the machine stage process which is active is determined. Following such inquiry, as represented at block 878, a determination is made as to whether the machine stage is ready for loading and, as represented at line 880 in the event that it is, then an inquiry is made as to whether the safety features of the system are active. In the event that either the process is not ready for loading as represented at line 884 or if the safety system is activated as represented at line 886, then as shown at block 888, the routine is rerun for the robot in question after the remaining robots are querried as to availability for activity. The program thus continues as represented by line 890 and block 872 to consider the next robot in the predetermined sequence.

Where the inquiry at block 882 determines that the safety systems are activated, then as represented by line 892 and block 894 a determination is made as to whether the workpiece or part which is being removed from the machine stage process or location is good. This information may be developed by a gauge signal or the like out of the machine in question. Where the indication is that the part or workpiece is not within tolerances or the like, then as represented by line 896 and block 898, the operator is alerted as to the presence of a tolerance problem. Additionally, as represented at block 900, the robot "N" assigned for the instant situation is provided an alternate program developed for a bad part or part out of tolerance. The worksheet data component of memory then is updated to reflect this bad part situation. Completion of the reassignment then is represented at line 902 leading to the robot start subroutine represented at block 904. Where the part removed from the process is acceptable, then as represented at line 906 and block 908 the robot in use, i.e. robot "N" is directed to use the program from the worksheet memory normally assigned to it and the program continues to the robot start subroutine at block 904.

Following the robot start subroutine, as represented at block 910 a determination is made as to whether the machine cycle or the like is ready. In the event that it is not, then as represented by line 912 and block 914 an error is published to the operator. Where the machine stage is ready, then as represented at line 916 and block 918 the machine stage is activated to carry out a cycle. The program then, to the extent available, activates all robots as represented at block 920 and, as represented at block 922, the robot monitor subroutine is called out wherein the activities of the robots may be evaluated. The program then returns as represented by node G and line 924 in FIG. 27A to continue to the next process procedure.

Figure 8:
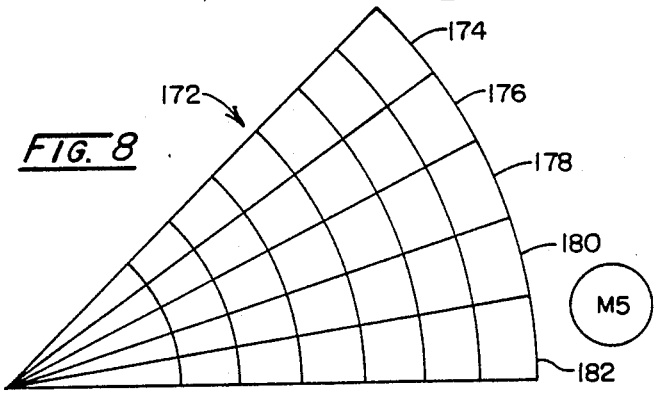
FIG. 8 is a diagrammatic sectional representation of the sectoring associated with an exemplary dynamic buffer employed with the system of the invention.
Figure 9:
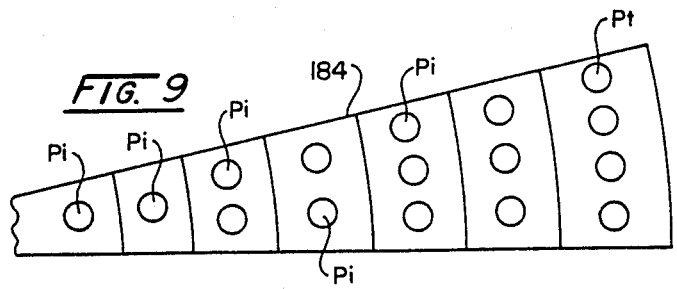
FIG. 9 is a diagrammatic representation of a segment of a buffer as in FIG. 8 showing exemplary piece part locations.
Figure 28:
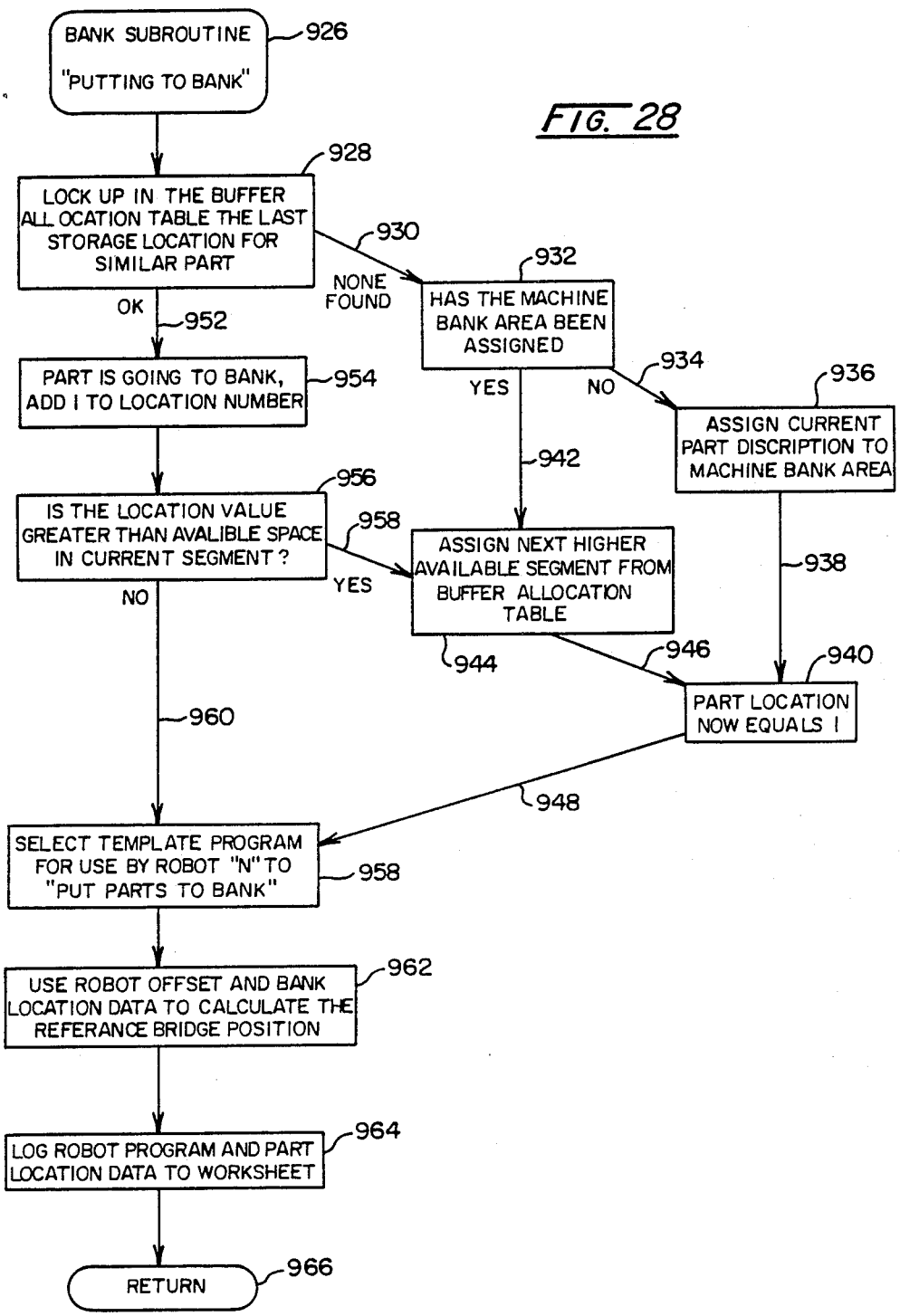
FIG. 28 is a flow chart showing a Putting To Bank subroutine employed with the control function of the manufacturing system of the invention.

Referring to FIG. 28, the Putting To Bank subroutine discussed above is described in diagrammatic fashion. This subroutine, as labelled at block 926, is concerned with moving a workpiece or part into an appropriate location within the dynamic buffer as described at 14 in FIGS. 1 and 2. The approach shown is employed, for example, with a sector defined dynamic buffer as discussed in conjunction with FIGS. 8 and 9 and, initially functions to determine a position in buffer storage which already is retraining workpieces similar to that under consideration for storage. Accordingly, as represented at block 928, a determination is made as to whether similar parts are already in storage within the dynamic buffer. In the event that no such workpieces are found, then as represented at line 930 and block 932, a determination is made as to whether there exists segment of buffer designated as a bank area or repository for parts having a completion level and identification associated with a given machine stage. All such machine stages have default storage locations which are defined in an initialization file and an allocation table associated with the dynamic buffer. Where the entire segment has not been assigned as determined at block 932, then as represented at line 934 and block 936, the current parts or workpiece description is assigned with respect to the designated machine bank area or segment. The program then continues as represented at line 938 and block 940 wherein instructions are provided for assigning a part location equal to 1 for this newly added type workpiece. Where the inquiry at block 932 results in an affirmative determination, then as represented at line 942 and block 944, a next higher available segment as described in conjunction with FIGS. 8 and 9 is assigned in the buffer allocation table. The program then continues as represented at line 946 and block 940 providing for the allocation of a first number or 1 as the part location. Then, as represented at line 948, the program progesses to the instruction at block 950 wherein a robot contained template program is selected for the purpose of positioning the workpiece at hand in the buffer assignment position. Generally, a template program will be one carried out by the robot control system but having the capability of receiving variables with respect to, for example, variations in positions within the dynamic buffer region 14.

Returning to block 928, where a storage location for a workpiece similar to that at hand has been located, then as represented by line 952 and block 954, a 1 is added to the location number as the next available position, and as represented at block 956, a determination is made as to whether the location value is greater than the available space within the segment containing the similar workpiece. Where that is the case, then as represented at line 958, a new segment is assigned as earlier discussed in conjunction with block 944. Where the determination with respect to block 956 is in the negative and a space is available, then as represented by line 960 and block 950, a template program is selected for the robot, N, at hand. The program then continues as represented at block 962 to calculate the reference bridge location. In this regard, the encoder associated with the bridge of the system generally may be referenced to a given robot, for example R1 in FIG. 1. However, it is necessary to determine which robot is the appropriate one to carry out the movement of the instant workpiece to the selected segment in the dynamic buffer 14. To make this determination, the bank position or segment location less the offset of the reference robot determines the noted reference bridge position. Robot template programs contain offset data to correct for robot position errors from the reference robot.

The program then continues as represented at block 964 wherein the noted robot program and workpiece location data are submitted to the worksheet component of memory and the subroutine returns as represented at node 966.

Figure 29:
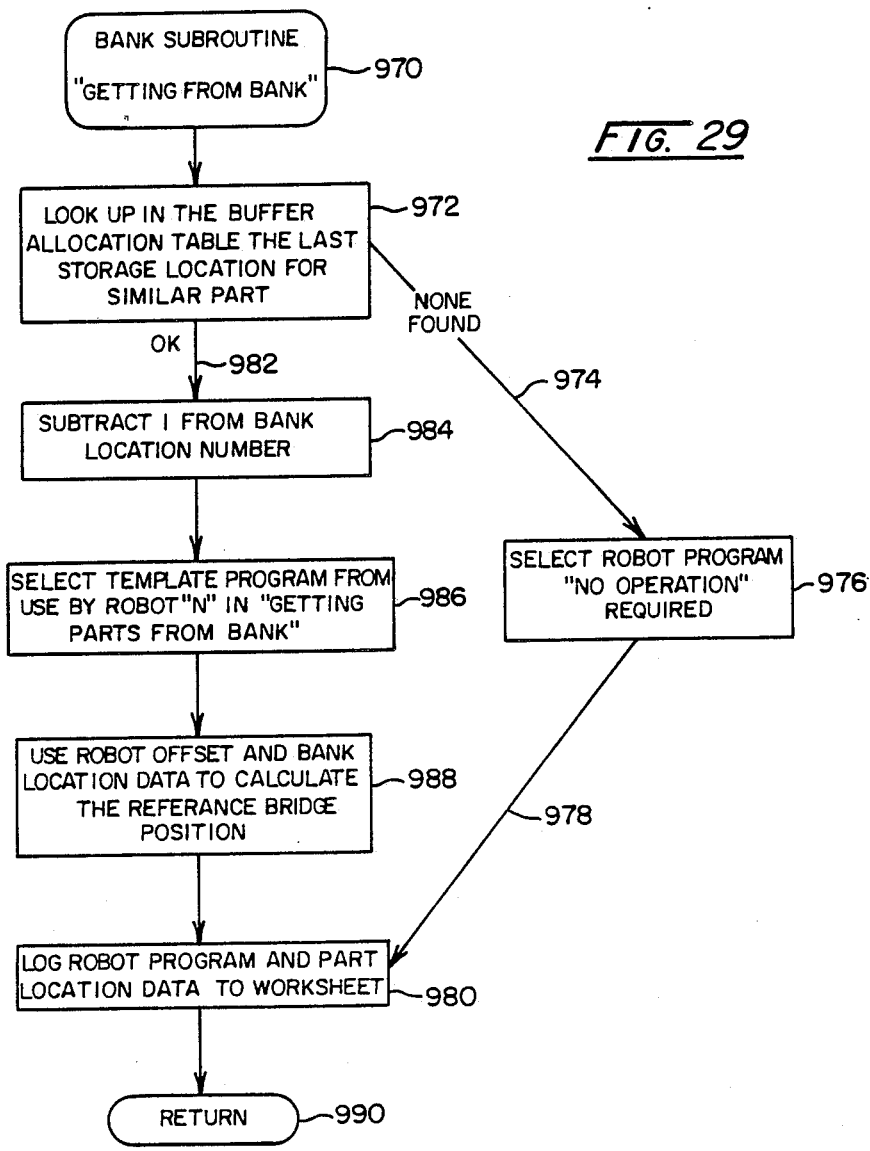
FIG. 29 is a flow chart showing a Getting From Bank subroutine employed with the control function of the manufacturing system of the invention.

Turning to FIG. 29, a subroutine for obtaining parts from the dynamic buffer referred to as "Getting From Bank" is shown introduced at the labelled block 970. As represented at block 972, the program looks up in the buffer allocation table the last storage location for the type part required. Where no such part is available, then as represented at line 974 and block 976, a "no operation" program is selected for the robot at hand such that no performance with respect to the instant requirement is called for. The routine then continues as represented at line 978 and block 980 wherein an appropriate entry is made to the worksheet portion of memory.

Where the inquiry at block 972 determines that an appropriate part is available, then as represented by line 982 and block 984 the bank location number is adjusted to reflect that the part located has been removed and the routine continues to the instructions represented at block 986 wherein an appropriate template program for use by the elected robot is selected for the purpose of obtaining the part requested. The program then continues to block 988 wherein the reference bridge location is calculated as described in conjunction with block 962 in FIG. 28. The routine then progresses as represented at block 980 wherein resultant data are submitted to the worksheet component of memory and, as represented at node 990, the subroutine returns.

Figure 30:
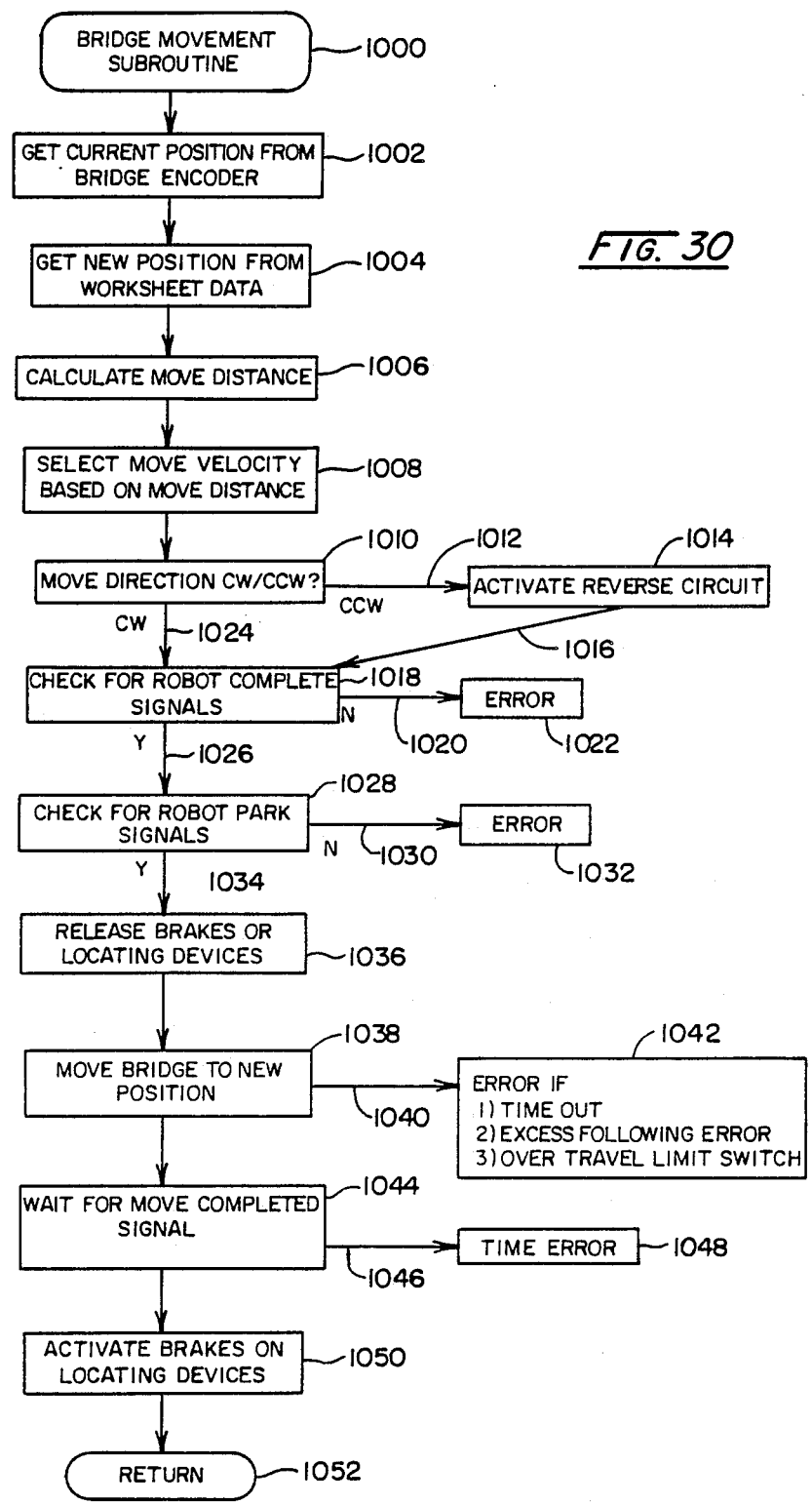
FIG. 30 is a flow chart of a Bridge Movement subroutine employed with the control function of the manufacturing system of the invention.

Referring to FIG. 30, a Bridge Movement Subroutine is depicted as labelled at block 1000. The routine commences with instructions at block 1002 providing for obtaining the current position of the system from the bridge encoder. The new position or position to which it is desired to move the bridge then is located in the worksheet component of memory as represented at block 1004 and, as represented at block 1006, the distance of required movement of the bridge is calculated. The routine then selects the appropriate velocity for the bridge movement based upon the distance required for moving as represented at block 1008. In this regard, smaller movements, for example in the 2 inch range, will generally require low velocities, for example, at 2-5 inches per second, while larger moves in the 100 inch range will employ a higher velocity, for example 25 inches per second. These selections can be provided in a conventional table look-up arrangement. The routine then continues to the inquiry at block 1010 wherein the move direction as to whether it is counter-clockwise (CCW) or clockwise (CW) is evaluated. Where the move is counter-clockwise, then as represented at line 1012 and block 1014, the reverse circuit is activated and, as represented at line 1016 and block 1018, a determination is made as to whether the robots carried by the bridge have completed their last assignment. In the event that they have not, then as represented at line 1020 and block 1022 an error message is sent to the operator.

Where the determination in conjunction with block 1010 is that a clockwise movement is required, then as represented by line 1024, the routine continues to check the robot as described in conjunction with block 1018. Where the robots have completed their last assignments, then as represented by line 1026 and block 1028, a determination is made as to whether the robots are in a park position for appropriate movement. Where they are not, then as represented by line 1030 and block 1032, an error signal is published for operator intervention. Where the park signals are received, then as represented at line 1034 and block 1036, the bridge brakes and/or locating devices are released and, as represented at block 1038 the bridge is moved to its next location. This move is evaluated and if error occurs as represented at line 1040 and block 1042 due to a time-out occurring before the move is completed by a monitoring timer, representing excess following error or velocity error, or overtravel of the limit switch, then operator intervention is called for. Bridge movement continues and when the bridge has completed its movement a Move Completed signal is generated. Accordingly, the subroutine waits until that signal occurs as represented at block 1044. In the event that an excessive amount of time occurs in awaiting the completed signal, then as represented at line 1046 and block 1048, a time error is published for operator intervention. Where the move signal is received, then as represented at block 1050 the bridge brakes or suitable locating devices are activated and the subroutine returns as represented at node 1052.

Figure 31:
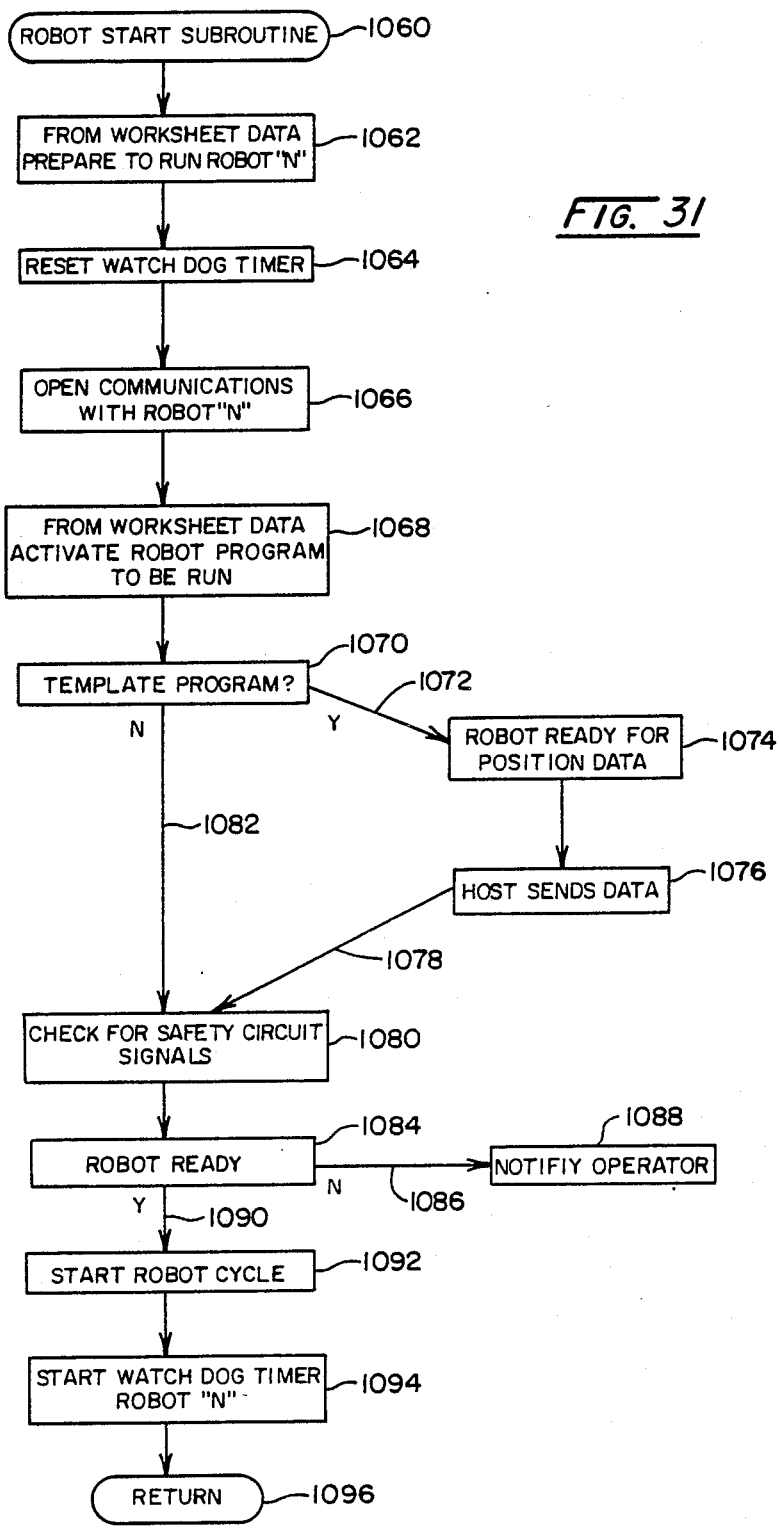
FIG. 31 is a flow chart of a Robot Start subroutine employed with the control features of the manufacturing system of the invention.

Referring to FIG. 31, a Robot Start subroutine is depicted as labelled at block 1060. This subroutine is employed for purposes of operations in conjunction with the dynamic buffer 14 as well as with loading given machine cycles within the manufacturing cell. The subroutine commences as represented at block 1062 carrying the instructions to acquire requisite data from the worksheet component of memory. The subroutine then resets the watchdog overall timer of the system as represented at block 1064 and, as represented at block 1066, the channels of communication with the robot at hand are opened. With these communications established, then as represented at block 1068, the robot program to be run is activated and as shown at block 1070, an inquiry is made as to whether the program so activated is a template program. Where that is the case, then as represented at line 1072 and block 1074, the robot is made ready to receive positioning data representing the earlier-noted variables for a conventional robot template program. As shown at block 1076, the host computer then sends that positional data and the routine continues as represented at line 1078 to check for safety signals which may cancel the operation at hand as represented at block 1080. Where no template program is at hand as determined at block 1070, then as represented by line 1082, the subroutine continues to the noted safety circuit check represented at block 1080. The subroutine then determines whether the robot is ready for activity as represented at block 1084. In the event that it is not, then as shown by line 1086 and block 1088, the operator is notified. Where the robot is ready, then as represented by line 1090 and block 1092, the robot cycle is started and, as represented at block 1094, the watchdog timer for this robot activity is started to determine whether or not the cycle of activity on the part of the robot is completed within the predetermined time for such activity. The subroutine then returns as represented at node 1096.

Figure 32:
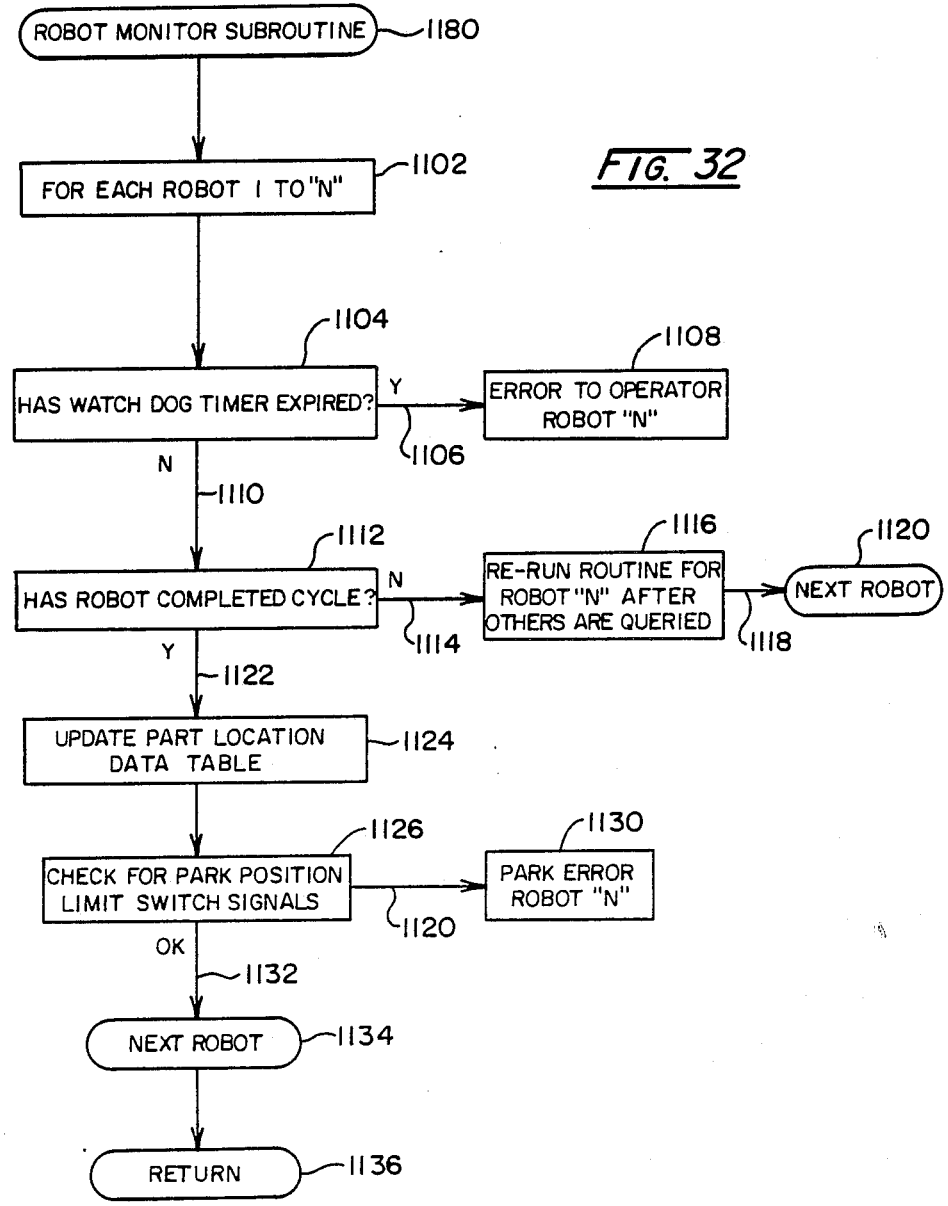
FIG. 32 is a flow chart of a robot monitor subroutine employed with the control features of the manufacturing system of the invention

Referring to FIG. 32, the robot monitor subroutine which may be employed with all robots is depicted and as generally labelled at block 1100. As represented at block 1102 and 1104, for each of the robots, for example numbered 1 through N, a determination is made as to whether the watchdog timer has expired. In this regard, the robots are expected to execute their programs or cycles within a predetermined interval of time and when that time expires without completion of the cycle, then as represented by line 1106 and block 1108, the operator is notified of the error in the particular robot at hand. Where the timing function has not expired, then as represented by line 1110, and block 1112, a determination is made as to whether the robot in question has completed its cycle. Where it has not, then as represented at line 1114 and block 1116, the routine is rerun for the robot under investigation after the other robots of the system are querried. The next robot then is addressed as represented at line 1118 and block 1120. Where the instant robot cycle is complete, then as represented at line 1122 and block 1124 the location data file updated to show the new position of the workpiece under manipulation. The routine then checks for the presence of robot park position limit switch signals representing that the robot has returned to that orientation following its activity. The final signal for such activity is a park position limit switch signal which is checked by the program as represented at block 1126. Where the limit switch signal does not occur following a cycle, then as represented by line 1128 and block 1130, a park error signal for the given robot is developed. As represented at line 1132 and block 1134, the subroutine then monitors the next robot of a given sequence thereof and following the monitoring of the last of the sequence, the subroutine returns as represented at block 1136.

Figure 33:
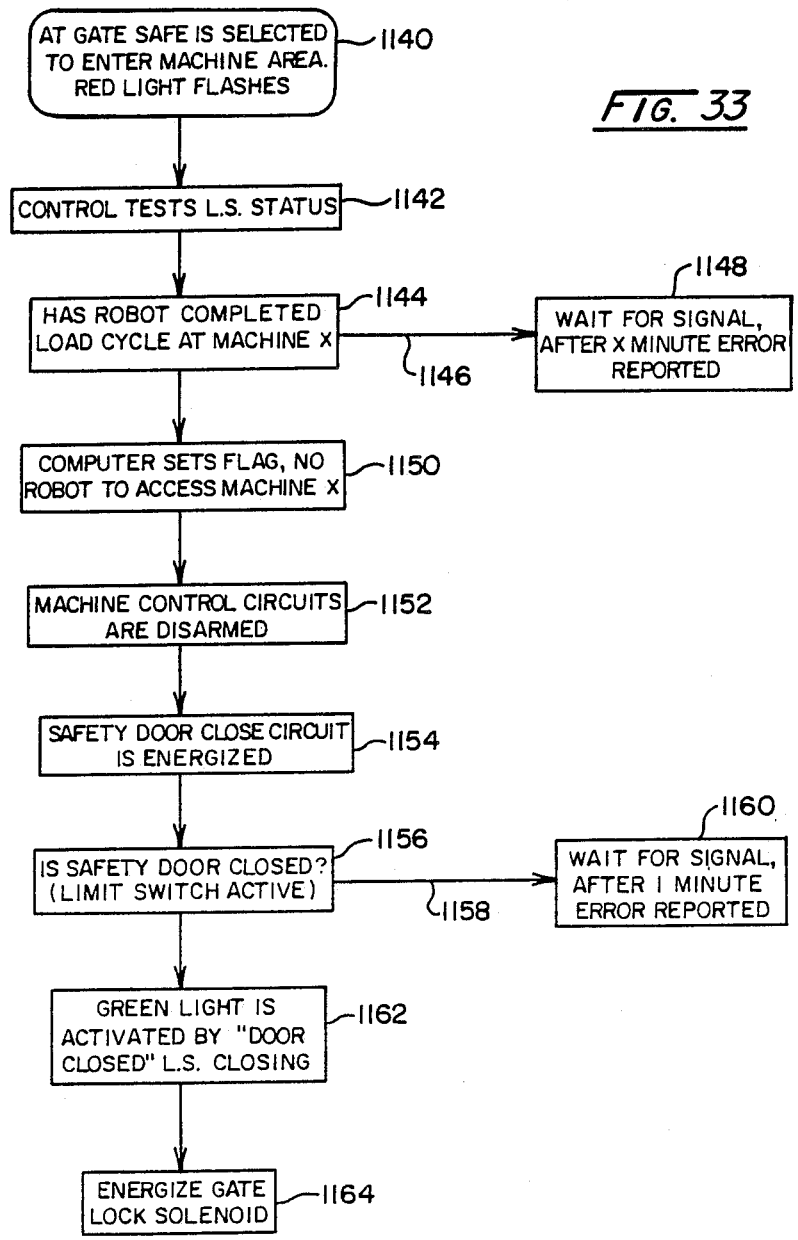
FIG. 33 is a flow chart showing a gate safe selection routine employed by the control function of the system of the invention.

Referring to FIG. 33, a program for selectively controlling operator access to a machine stage region as discussed in conjunction with FIGS. 13 and 14 is set forth. The program commences with a Safe To Enter Machine Area selection on the part of the operator as set forth at block 1140. Generally, a red light will flash indicating that the region is not clear at that instant but is in the process of carrying out a clearing process such that the operator ultimately may enter. The program continues as represented at block 1142 wherein the status of each of the limit switches involved is tested including those associated with the gates, safety frames and robot supporting beam position. As represented at block 1144, a determination is made as to whether the robot associated with that machine stage has completed a loading procedure and in the event that such a completion indication is not available, then as represented at line 1146 and block 1148, the program waits for a predetermined interval after which if no completion signal is received, an error signal is recorded. No access is made available until the error is understood and corrected. The program then continues as represented at block 1150 wherein the host computer sets a flag to provide that no robot is to access the machine stage to which the operator wishes to gain entry and, as shown at block 1152, the control circuits for that machine stage are disarmed. The program continues as represented at block 1154 wherein the safety door or overhead safety frame circuit is energized to carry out movement of the frame or door into its machine area protective orientation referred to as "closed". When the limit switch indicating that such closure is active as represented in block 1154 the program is permitted to continue. However, until such a signal derived from the limit switch is received, then as represented at line 1158 and block 1160, the waiting period ensues, for example 1 minute. If no limit switch signal is received within that 1 minute interval, then an error is reported and access is not permitted. The program continues as represented at blocks 1162 and 1164 wherein a green light is illuminated at the gate entrance such that the operator is permitted to initiate entry and, in this regard, the solenoid controlling the gate lock is energized to permit the operator to enter the machine stage region for the one machine stage to which access is sought.

Referring to FIG. 34, a program for returning a machine stage to line activity is represented as labelled at block 1170. The program initially inquires as to whether the mat switch as at 440 in FIG. 14 is active and, in the event that it is, as represented at line 1174 and block 1176, an error is reported and no robot action is allowed at that machine stage until the region is cleared. Where the mat switch is not active, then as represented at line 1178 and block 1180, a determination is made as to whether the gate permitting access into the area is closed. In the event that it is not, then as represented at line 1182 and block 1184, an error is reported and the control will not permit robot action at that machine stage until the condition is cleared. Where an indication is received that the access gate is closed then, as represented at line 1186 and block 1188, the safety door or frame open solenoid is energized to provide for a driving of the safety frame as at 396 in FIG. 14 to an open condition permitting robot access. The program continues as represented at block 1190 to determine whether or not the limit switch representing an open safety door has provided an appropriate signal. In the event that no such signal has been received, then as represented at line 1192 and block 1194, an error is reported and no robot action is allowed at that machine stage until the condition is cleared. Where a determination that the safety door open condition limit switch signal has been received, then as represented at line 1196 and block 1198, a red light is activated at the entrance panel by the door close limit switch opening. The red light provides an indication that the machine area is available for robot access. Finally, as represented at block 1200, at the console, workpiece or part data are updated and the machine stage is put on-line. The robot is then permitted to access the machine stage upon the next cycle.

Referring to FIG. 35, a chart showing conditions in which a robot is brought to an emergency stop is presented. In this regard, block 1210, line 1212 and block 1214 shows that an emergency stop for a robot occurs where the safety frame or door switches are opened and closed at the same time. Block 1216, line 1218, and block 1214 show that an emergency stop of the robot will occur where the gate limit switch indicates a gate is open, safe is not selected by the individual accessing the gate, and the safety door or frame is open permitting robot access to the associated machine stage. Block 1220, line 1222 and lock 1214 show that the emergency stop condition occurs where the floor mat switch indicates that an operator is present at the machine, the safe condition is not selected, and the safety frame or door is in an open condition.

FIG. 376 shows the condition wherein a robot feed hold status is developed. In this regard, block 1230 is seen identifying that the crash sensor activated from the safety frame or door has been activated and, as represented at line 1232 and block 1234, the feed hold activation occurs.

As noted above, the multi-tiered buffer structure advantageously may be configured so that individual tiers of the buffer or bank are movable to position pieceparts at locations for access by robots. Under such considerations, the robots may be stationary as discussed above or the extent of movement thereof be limited and thus lower the structural involvement of the system. Generally, a movable tiered bank may be either circular or rounded rectangular shape and the multiple ring configuration can be constructed to move as ring groupings or as individual rings. Of particular usefulness, banks may be manipulated in dual directions such that where stages are called upon to carry out repeat processing, the random dynamic access of the buffer becomes quite valuable. Further, there may be realized a decreased access time for the buffer inasmuch as manipulation of the latter is carried out preferably while the machine stages are operational with a next previous part. Other advantages accrue involving, where appropriate, lower tolerances for the annular overhead structure supporting the robot and, for many instances, the robots may be limited in travel to the extent that no more expensive way surfaces corresponding bearings and way covers are required for implementation. Further, robots of lower capability may be employed in many applications.

Similar to the discussion associated with FIGS. 8 and 9, part spacing can take on two basic forms, radial and constant spacing. Radial spacing provides for the division of the circular buffer area into regular increments based upon radials from the center point of the buffer. The effect of such radial spacing is that all individual movable rings of the buffer have the same quantity of storage locations and subdivisions. This consistency permits a simplified algorithm to store track, and retrieve pieceparts. However, the total storage area of the buffer is reduced due to the increased part spacings within the outer ring of the buffer.

Constant spacing of pieceparts provides for maximizing storage capacity within the buffer. Parts in this arrangement are spaced at the same distance around the circumference of each of the rings, e.g. 6 inches on center. While each ring of the buffer may have the same number of sub-divisions, each such sub-division and each ring will contain a different quantity of parts. Any algorithm for this example is more complex due to the varying part count per sub-division and the lack of positioning commonality for each ring. Of course, where the outer rings, for example, become larger, a higher resolution positioning system may be called for.

Figure 37:
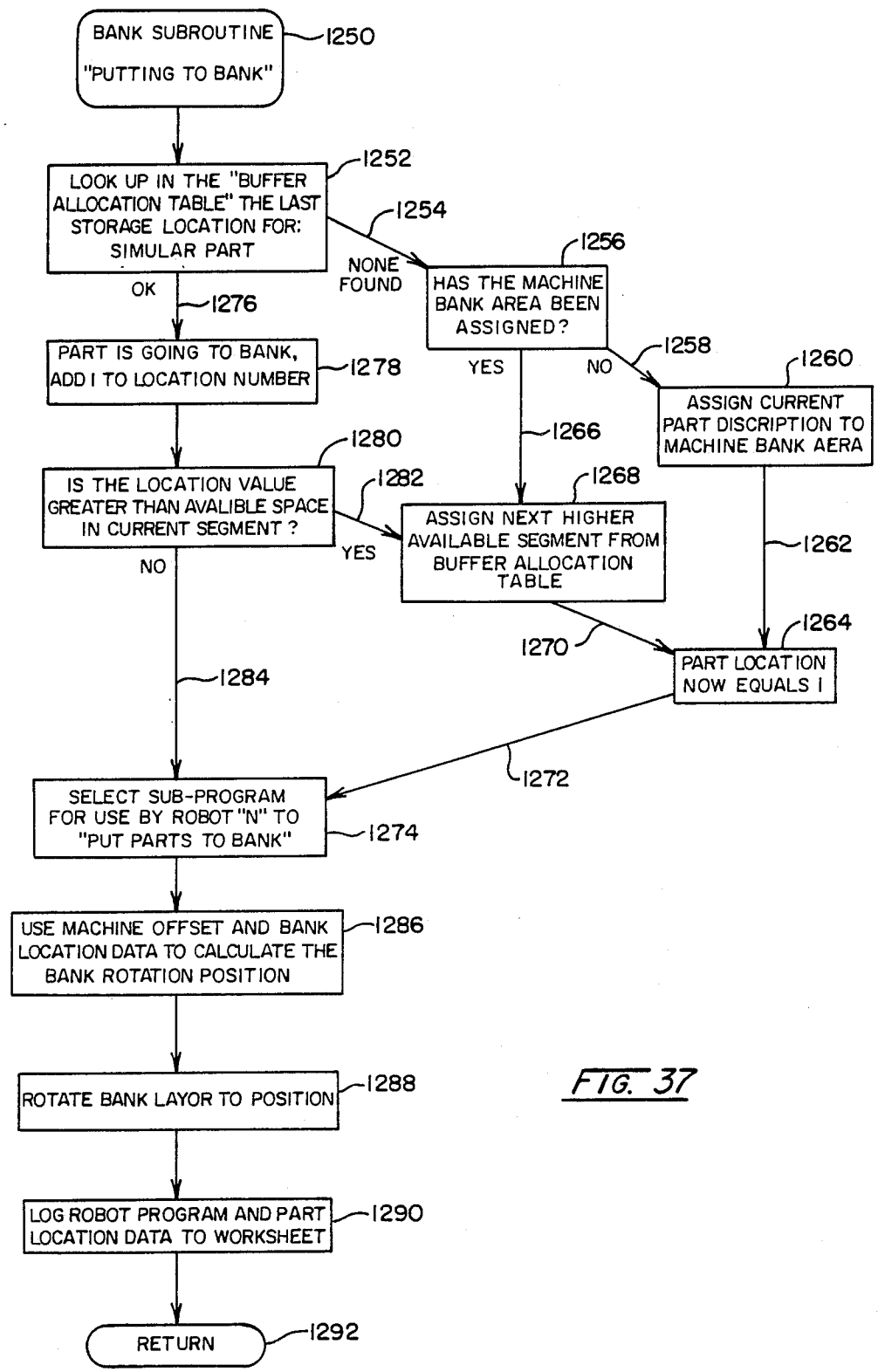
FIG. 37 is a flow chart showing a Putting to Bank subroutine employed with a rotating buffer embodiment for the control system of the invention.

Looking to FIG. 37, a "Putting to Bank" sub-routine intended for application with rotary ring banks is provided. This sub-routine will be seen quite similar to that described earlier in conjunction with FIG. 28 and is seen to commence at node 1250 leading to the instructions at block 1252. The latter instructions determine a position in buffer storage which already is retaining workpieces similar to that under consideration for storage. In the event that no such workpieces are found, then as represented at line 1254 and block 1256, a determination is made as to whether there exists a segment of buffer designated as a bank area or repository for parts having a completion level and identification associated with a given machine stage. All such machine stages have default storage locations which are defined in an initialization file and an allocation table associated with the dynamic buffer. Where the entire segment has not been assigned, as determined at block 1256, then as represented at line 1258 and block 1260, the current parts or workpiece description is assigned with respect to the designated machine bank area or segment. The program then continues as represented at line 1262 and block 1264 wherein instructions are provided for assigning a part location equal to 1 for this newly-added type workpiece. Where the inquiry at block 1256 results in an affirmative determination, then as represented at line 1266 and block 1268, a next higher available segment of buffer is assigned in the buffer allocation table. The program then continues as represented at line 1270 and block 1264 providing for the allocation of a first number or 1 as a part location. Then, as represented at line 1272, the program progresses to the instructions at block 1274 wherein a robot contained template program is selected for the purpose of positioning the workpiece at hand in the buffer assignment position. Generally, a template program will be one carried out by the robot control system but having the capability of receiving variables with respect to, for example, variations in positions within the dynamic buffer.

Returning to block 1252, where a storage location for a workpiece similar to that at hand has been located, then as represented by line 1276 and block 1278, a 1 is added to the location number as the next available position, and as represented at block 1280, a determination is made as to whether the location value is greater than the available space within the segment containing a similar workpiece. Where that is the case, then as represented at line 1282, a new segment is assigned as earlier discussed in conjunction with block 1268. Where the determination is respect to block 1280 is in the negative and space is available, then as represented by line 1284 and block 1274, a template program is selected for the robot, N, at hand. The program then continues as represented at block 1286 to calculate the position for rotating the bank or buffer ring segment at hand. In this regard, encoders associated with both bridge, where utilized, and buffer are employed. Upon completion of such calculations, as represented at block 1288, the buffer ring or bank layer is rotated to an appropriate position. The program then continues as represented at block 1290 wherein the noted robot program and workpiece location data are submitted to the worksheet component of memory and the sub-routine returns as represented at node 1292.

Figure 38:
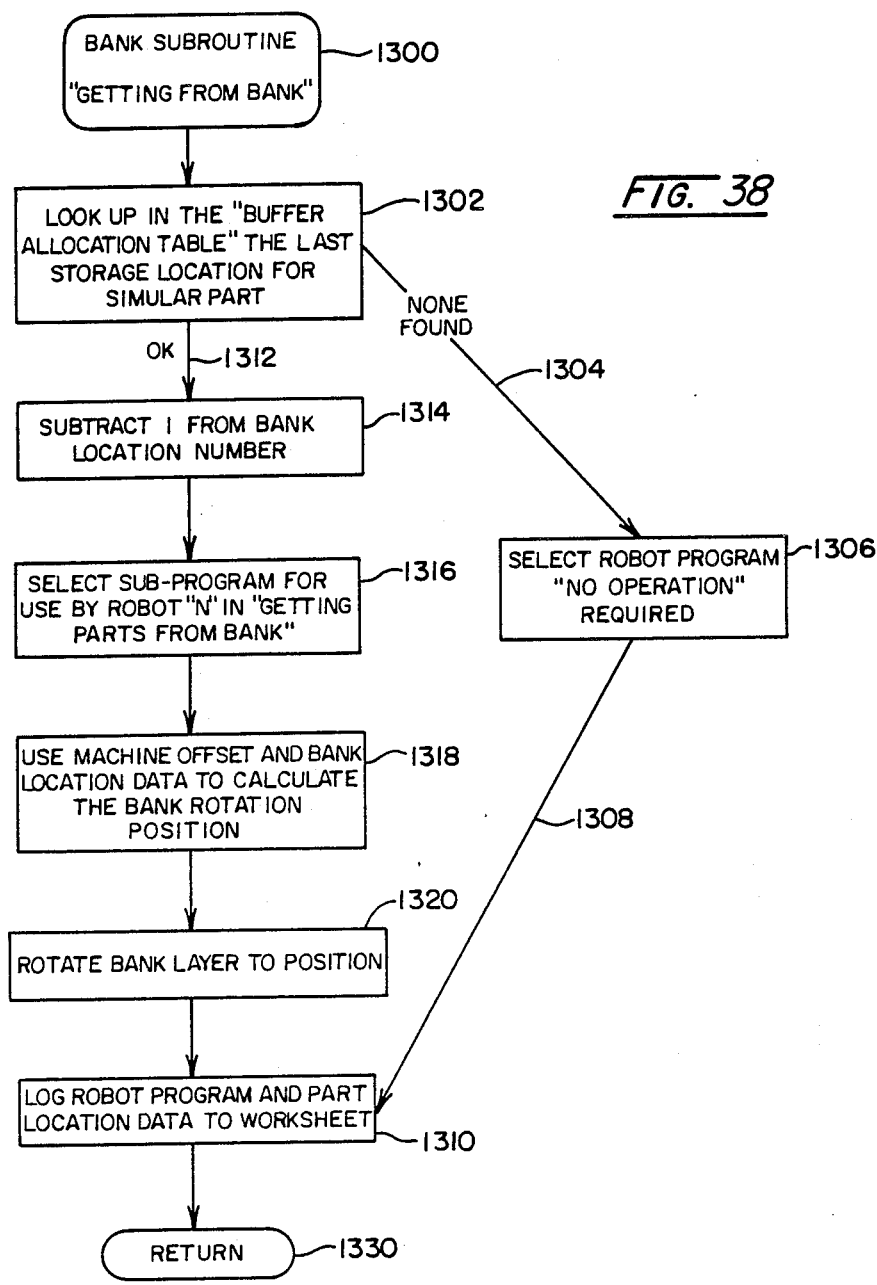
FIG. 38 is a flow chart showing a Getting from Bank subroutine employed with a rotating buffer embodiment for the control function of the system of the invention.

Turning to FIG. 38, a sub-routine similar to that discussed above in connection with FIG. 29 for obtaining parts from the dynamic buffer of a rotational ring variety and referred to as "Getting from Bank" is shown introduced at the labeled block 1300. As represented at block 1302, the program looks up in the buffer allocation table the last storage location for the type part required. Where no such part is available, then as represented at line 1304 and block 1306, a "no operation" program is selected for the robot at hand such that no performance with respect to the instant requirement is called for. The routine then continues as represented at line 1308 and block 1310 wherein an appropriate entry is made to the worksheet portion of memory.

Where the inquiry at block 1302 determines that an appropriate part is available, then as represented by line 1312 and block 1314, the bank location number is adjusted to reflect that the part located has been removed and the routine continues to the instructions represented at block 1316 wherein an appropriate template program for use by the elected robot is selected for the purpose of obtaining the part requested. The program then continues to block 1318 wherein machine offset and bank or buffer location data is employed to calculate the bank or buffer ring rotation position. The routine then progresses as represented at block 1320 to carry out rotation of the bank layer to the calculated position. Then, as represented at block 1310, the resultant data are submitted to the worksheet component of memory and, as represented at node 1330, the subroutine returns.

Since certain changes may be made in the above system, apparatus and method without departing from the scope of the invention herein involved, it is intended that all matter contained in the above description or shown in the accompanying drawings shall be interpreted as illustrative and not in a limiting sense.

We claim:

1. A manufacturing system wherein workpieces are treated at a predetermined sequence of machine stages from first to last having given machine cycle time characteristics, comprising:

a dynamic buffer having a predetermined periphery within which is provided a support surface for accessibly supporting select ones of said workpieces at assigned locations thereon;

a machine stage region positioned adjacent said dynamic buffer periphery for retaining said machine stages;

input means for positioning incoming said workpieces at an input region;

output means for receiving said workpieces subsequent to treatment by said last machine stage;

robot means for accessing said dynamic buffer and said machine stage region and for effecting movement of said workpieces from said input region, to and from said machine stages, said dynamic buffer support surface, and to said output means in response to control inputs; and control means having a predetermined control program for deriving said control inputs to effect movement of said workpieces by said robot means in accordance with said predetermined sequence and for identifying and assigning available said dynamic buffer locations and effecting movement by said robot means of select said workpieces to said assigned locations for temporary retention to accommodate variations of said machine cycle time characteristics and unforeseen machine cycle delays.

2. The manufacturing system of claim 1 including overhead support means for supporting said robot means above said dynamic buffer and said machine stage region.

3. The manufacturing system of claim 1 including:

security means including human barrier means extending about said machine stage region and having controlled access gate means for providing human access to the immediate maintenance vicinity of select said machine stages when enabled; and said control means is responsive to a maintenance access signal to restrict said movement of said robot means from travel into said immediate maintenance vicinity and to enable said controlled access gate means.

4. The manufacturing system of claim 3 including:

overhead support means for supporting said robot means above said dynamic buffer and said machine stage region; and including safety barrier means mounted above said machine stage region and actuable for movement from a standby position to a safety position over a said machine stage immediate maintenance vicinity selected to physically prevent robot means movement thereinto; and said control means is responsive to said maintenance access signal for effecting said safety barrier actuation.

5. The manufacturing system of claim 1 which:

said dynamic buffer periphery is generally arcuate;

said machine stage region is configured for retaining said machine stages along a generally arcuate locus; and including overhead support means for supporting said robot means above said dynamic buffer and said machine stage region.

6. The manufacturing system of claim 5 which said overhead support means comprises:

an arcuate outer support rail mounted above said machine stage region;

robot support beam means for carrying said robot means and extending above and across said dynamic buffer and having end assembly means supported by and, movable along, said outer support rail; and drive means responsive to said control means for effecting rotational movement of said robot support beam means to derive select movement of said robot means to access said dynamic buffer and said machine stages.

7. The manufacturing system of claim 6 in which said overhead support means further includes central support means positioned generally centrally of said dynamic buffer, extending thereabove, and pivotally coupled with said robot support beam means for effecting support thereof.

8. The manufacturing system of claim 6 in which said drive means comprises a motor drive assembly responsive to said control means mounted upon said robot support beam means end assembly means and contacting said support rail to provide select tractive rotational drive to said robot support beam means.

9. The manufacturing system of claim 8 in which:

said support rail is configured having a smooth way surface for supporting said bridge beam means at said end assembly and a drive portion; and said drive means includes a motor driven drive component in contact with said support rail drive portion for effecting said tractive drive.

10. The manufacturing system of claim 1 in which:

said dynamic buffer is disposed about a center location;

said machine stage region is configured for retaining said machine stages along a generally circular locus;

further including:

an outer, support generally circular support rail mounted above said machine stage region;

robot support beam means extening over said center location and having diametrically oppositely-disposed end assemblies supported by and moveable along said outer support rail for manually supporting said robot means above said dynamic buffer and said machine stage region.

11. The manufacturing system of claim 10 including central support means positioned at said center location and pivotally coupled with said robot support beam means for effecting centrally disposed pivotal support thereto.

12. The manufacturing system of claim 11 in which said central support means includes a pivot bearing positioned below said robot support beam and an offset, vertically oriented structural extension fixed to the center of said robot support beam and pivotally supported upon said pivot bearing, whereby said robot means may be moved between said end assemblies across said center location.

13. The manufacturing system of claim 11 further including:

stationary gear means fixed to said central support means in the vicinity of said pivotal support; and motor means fixed to said robot support beam means in the vicinity of said pivot support and having a rotational drive output coupled in engaging relationship with said stationary gear means and energizable to effect pivotal movement of said robot support means.

14. The manufacturing system of claim 1 in which:

said machine stage region is configured for retaining said machine stages in predetermined discrete groupings, each arranged along a generally circular locus;

further including:

a discrete circular outer support rail positioned above said machine stage region at each said predetermined discrete machine stage grouping;

central support means extending vertically from said dynamic buffer for providing a pivot support above said dynamic buffer corresponding with each said discrete circular outer support rail;

discrete robot supporting beam means pivotally coupled with said pivot support and extending to an end assembly supported by and movable along a corresponding said discrete circular outer support rail for supporting said robot means; and drive means responsive to said control means for effecting rotational movement of said robot supporting beam means to access said dynamic buffer and said predetermined discrete machine stage grouping.

15. The manufacturing system of claim 1 in which:

said dynamic buffer is disposed about a central location;

further including:

outer, generally circular support rail means positioned above said machine stage region.

central support means positioned at said central location for providing a pivotal support;

robot support beam means having one end supported for rotation at said pivotal support and extending radially to an opposite end terminating at an end assembly supported by and movable along said support rail means for movably supporting said robot means above predetermined portions of said dynamic buffer and said machine stage region; and drive means responsive to said control means for effecting pivotal movement of said robot support beam means about said pivotal support to derive select movement of said robot means to access said dynamic buffer and said machine stages within said predetermined portions of said buffer and said machine stage region.

16. The manufacturing system of claim 15 in which said drive means comprises:

stationary gear means fixed to said central support means in the vicinity of said pivotal support; and motor means fixed to said robot support beam means in the vicinity of said pivot support and having a rotational drive output coupled in engaging relationship with said stationary gear means and energizable to effect pivotal movement of said robot support means.

17. The manufacturing system of claim 1 in which said dynamic buffer comprises a multi-tiered assemblage of support surfaces for temporary storage of select said workpieces.

18. The manufacturing system of claim 1 in which said dynamic buffer comprises a selectively movable support surface for temporary storage of select said workpieces.

19. The manufacturing system of claim 1 in which
said machine stage region is configured for retaining said machine stages in first and second spaced, parallel linear arrays, said dynamic buffer is positioned intermediate said spaced first and second linear arrays of machine stages and includes a said workpiece support surface having a first region adjacent a first linear array and a second region adjacent said second array, said surface being movable to selectively transfer workpieces supported thereby between said first and second regions;
further including:
first overhead gantry bridge means including spaced parallel rails extending along said first linear array of machine stages and said first region for supporting a first said robot means;
second overhead gantry bridge means including spaced parallel rails extending along said second linear array of machine stages and said second region for supporting a second said robot means; and
said control means is responsive to control said movement of said dynamic buffer workpiece support surface to effect workpiece transfer communication between said first and second robot means.

20. The manufacturing system of claim 1 in which:
said machine stage region is configured for retaining said machine stages in predetermined groupings, said groupings being arranged along a generally circular locus;
said robot means comprises a discrete robot fixedly positioned for accessing an assigned said predetermined machine stage grouping and said dynamic buffer.

21. The manufacturing system of claim 20 in which:
said dynamic buffer support surface is movable to selectively transfer workpieces supported thereby to within accessing reach of each said discrete robot; and
said control means is responsive to control said support surface movement.

22. A manufacturing system wherein workpieces are treated at a predetermined sequence of machine stage from first to last having given machine cycle time characteristics comprising:
a dynamic buffer having a predetermined periphery within which is provided a support surface for accessibly supporting select ones of said workpieces at assigned locations thereon.
a machine stage region positioned adjacent said dynamic buffer periphery and configured for retaining said machine stages in predetermined groupings;
input means for positioning incoming said workpieces at an input region;
output means for receiving said workpieces subsequent to treatment by said last machine stage;
first robot means mounted for accessing each said machine stage predetermined grouping for effecting movement of said workpieces therebetween in response to control inputs;
second robot means mounted for accessing said dynamic buffer for effecting movement of said workpieces therewith in response to control inputs; and
control means having a predetermined control program for deriving said control inputs to effect movement of said workpieces by said first and second robot means to effect said predetermined sequence of treatment and for identifying and assigning available said dynamic buffer locations and effecting movement by said second robot means of select workpieces to said assigned locations for temporary retention to accommodate variations of said cycle time characteristics and unforeseen machine cycle delays.

23. The manufacturing system of claim 22 including:
means defining transfer stations intermediate said predetermined machine stage groupings;
said first robot means is mounted for additionally accessing said transfer stations associated with each said machine stage predetermined grouping; and
said second robot means is mounted for accessing said transfer stations for effecting said movement of said workpieces between said dynamic buffer and said transfer stations.

24. The manufacturing system of claim 22 in which:
said first robot means comprises a discrete robot fixedly positioned for accessing an assigned said predetermined machine stage grouping; and
including overhead support means for supporting said second robot means above said dynamic buffer.

25. The manufacturing system of claim 24 in which said overhead support means comprises:
an arcuate outer support rail mounted above said machine stage region;
robot support beam means for carrying said second robot means and extending above and across said dynamic buffer and having end assembly means for providing bearing support for permitting supported movement of said beam means along said outer support rail; and
drive means responsive to said control means for effecting rotational movement of said robot support beam means to derive select movement of said second robot means to access said dynamic buffer.

26. The manufacturing system of claim 25 in which:
one said predetermined grouping includes said first machine stage; and
said first robot means associated therewith is responsive to said control means to load said workpieces from said input region into said first machine stage.

27. The manufacturing system of claim 25 in which:
one said predetermined grouping includes said last machine stage; and
said first robot means associated therewith is responsive to said control means to unload said workpieces from said last machine stage and load them into said output means.

28. The manufacturing system of claim 22 in which:

said first robot means comprises track means positioned to extend before each said predetermined grouping of machine stages for moveably supporting a robot, and a said robot moveable upon said track means for accessing said grouping of machine stages; and said second robot means is fixedly mounted centrally of said dynamic buffer.

29. The manufacturing system of claim 28 in which one said predetermined grouping includes said first and last machine stages and the first robot means associated therewith is responsive to said control means to load said workpieces from said input region into said first machine stage and to unload workpieces from said last machine stage onto said output means.

30. The manufacturing system of claim 22 in which:
said first robot means comprises a discrete robot fixedly positioned for accessing an assigned said predetermined machine stage grouping and associated said transfer stations; and
said second robot means fixedly mounted centrally of said dynamic buffer.

31. The manufacturing system of claim 30 in which:
one said predetermined grouping includes said first machine stage; and
said first robot means associated therewith is responsive to said control means to load said workpieces from said input region into said first machine stage.

32. The manufacturing system of claim 30 in which:
one said predetermined grouping includes said last machine stage; and
said first robot means associated therewith is responsive to said control means to unload said workpieces from said last machine stage and, load them into said output means.

33. The method for treating workpieces at a predetermined sequence of industrial process locations from first to last, said locations exhibiting varying treatment intervals, comprising the steps of:
providing a dynamic buffer having a support surface with temporarily assignable storage locations for said workpieces;
locating said process locations about the periphery of said dynamic buffer;
providing a supply of untreated said workpieces;
providing a robot assemblage controllable to maneuver said workpieces in accordance with control instructions from said supply to said process locations and to and from said dynamic buffer support surface;
assigning part identification completion level and instantaneous position data to each said workpiece from said supply;
controlling said robot assemblage with said control instructions to maneuver said workpieces into and out of a predetermined sequence of said process locations;'
updating said completion level and instantaneous position data of each said workpiece in correspondence with said maneuvering thereof;
assigning available said temporary storage locations for said workpieces having given said completion levels when said treatment intervals vary to create supplies of said workpieces in excess of those required by succeeding said process locations within said predetermined sequence;
controlling said robot assemblage to move said workpieces having said given competion levels to said assigned temporary storage locations;
identifying said process locations requiring said workpieces having said given completion levels and corresponding said storage locations retaining said workpieces; and
controlling said robot assemblage to move said identified workpieces having said given completion levels into said identified process locations.

34. The method of claim 33 in which said step of assigning available temporary storage locations for said workpieces is carried out to effect positioning of workpieces having similar completion levels at substantially adjacent said storage locations.

35. The method of claim 33 in which said provision of a robot assemblage includes the provision of a rotationally moveable robot support beam for suspending robots therefrom over said dynamic buffer and said process locations.

36. A manufacturing system wherein workpieces are treated at a predetermined sequence of machine stages from first to last, comprising:
a machine stage region for retaining said machine stages in a predetermined sequence;
input means for positioning incoming said workpieces at an input region;
output means for receiving said workpieces subsequent to treatment by said last machine stage;
robot means for accessing said machine stage region and for effecting movement of said workpieces from said input region, to and from said machine stages and to said output means in response to control inputs;
overhead support means for movably supporting said robot means above said machine stage region to effect said machine stage accessing;
safety barrier means mounted above select said machine stages within said machine stage region and actuable for movement from a standby position to a safety position over a said select machine stage immediate maintenance vicinity to physically pevent robot means movement thereinto; and
control means having a predetermined control program for deriving said control inputs to effect movement of said workpieces by said robot means in accordance with said predetermined sequence, and responsive to a maintenance access signal to restrict said movement of said robot means from travel into said immediate maintenance vicinity and to effect said safety barrier actuation.

37. The manufacturing system of claim 36 including:
security means including human barrier means extending about said machine stage region and having controlled access gate means for providing human access to said immediate maintenance vicinity of select said machine stage when enabled; and
said control means is responsive to said maintenance access signal to enable said controlled gate means.

* * * * *